(12) United States Patent
Stover et al.

(10) Patent No.: US 10,690,055 B2
(45) Date of Patent: Jun. 23, 2020

(54) ENGINE COMPONENTS WITH IMPINGEMENT COOLING FEATURES

(71) Applicant: General Electric Company, Schenectady, NY (US)

(72) Inventors: Curtis Walton Stover, West Chester, OH (US); Jonathan Michael Rausch, West Chester, OH (US); Satoshi Atsuchi, Rexford, NY (US); Gulcharan Singh Brainch, West Chester, OH (US); Robert David Briggs, West Chester, OH (US); Ronald Scott Bunker, Placitas, NM (US); Ambarish Jayant Kulkarni, Niskayuna, NY (US); Michael Alan Meade, West Chester, OH (US); Byron Andrew Pritchard, Cincinnati, OH (US); Robert Proctor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 509 days.

(21) Appl. No.: 15/314,490

(22) PCT Filed: May 27, 2015

(86) PCT No.: PCT/US2015/032597
§ 371 (c)(1),
(2) Date: Nov. 28, 2016

(87) PCT Pub. No.: WO2016/025054
PCT Pub. Date: Feb. 18, 2016

(65) Prior Publication Data
US 2017/0101932 A1 Apr. 13, 2017

Related U.S. Application Data

(60) Provisional application No. 62/004,697, filed on May 29, 2014, provisional application No. 62/004,685, filed on May 29, 2014.

(51) Int. Cl.
*F02C 7/18* (2006.01)
*F01D 11/08* (2006.01)
(Continued)

(52) U.S. Cl.
CPC ............ *F02C 7/18* (2013.01); *F01D 5/189* (2013.01); *F01D 9/041* (2013.01); *F01D 11/08* (2013.01);
(Continued)

(58) Field of Classification Search
CPC . F02C 7/18; F01D 5/189; F01D 9/041; F01D 11/08; F01D 25/12; F23R 3/002;
(Continued)

(56) References Cited

U.S. PATENT DOCUMENTS 4,293,275 A    10/1981  Kobayashi et al.
4,303,371 A *  12/1981  Eckert ................. F01D 11/08
                                                415/116

(Continued)

FOREIGN PATENT DOCUMENTS

EP    0648979 A1   4/1995
EP    1284338 A2   2/2003
(Continued)

OTHER PUBLICATIONS

European Search Report and Opinion issued in connection with Related EP Application No. 15168849.6 dated Oct. 28, 2015.
(Continued)

*Primary Examiner* — David Hamaoui
*Assistant Examiner* — John D Bailey
(74) *Attorney, Agent, or Firm* — McGarry Bair PC

(57) ABSTRACT

Gas turbine engine components are provided which utilize an insert to provide cooling air along a cooled surface of an engine component. The insert provides cooling holes or apertures which face the cool side surface of the engine
(Continued)

component and direct cooling air onto that cool side surface. The apertures may be formed in arrays and directed at an oblique or a non-orthogonal angle to the surface of the insert and may be at an angle to the surface of the engine component being cooled. An engine component assembly is provided with counterflow impingement cooling, comprising an engine component cooling surface having a cooling fluid flow path on one side and a second component adjacent to the first component. The second component may have a plurality of openings forming an array wherein the openings extend through the second component at a non-orthogonal angle to the surface of the second component.

33 Claims, 19 Drawing Sheets

(51) Int. Cl.
  *F01D 25/12* (2006.01)
  *F01D 9/04* (2006.01)
  *F01D 5/18* (2006.01)
  *F23R 3/00* (2006.01)

(52) U.S. Cl.
  CPC .............. *F01D 25/12* (2013.01); *F23R 3/002* (2013.01); *F23R 3/005* (2013.01); *F05D 2240/81* (2013.01); *F05D 2250/38* (2013.01); *F05D 2260/201* (2013.01); *F05D 2260/202* (2013.01); *F05D 2260/22141* (2013.01); *F05D 2260/607* (2013.01); *F23R 2900/03042* (2013.01); *F23R 2900/03043* (2013.01); *F23R 2900/03044* (2013.01); *F23R 2900/03045* (2013.01); *Y02T 50/673* (2013.01); *Y02T 50/676* (2013.01)

(58) Field of Classification Search
  CPC ............ F23R 3/005; F23R 2900/03042; F23R 2900/03043; F23R 2900/03044; F23R 2900/03045; F05D 2240/81; F05D 2250/38; F05D 2260/201; F05D 2260/202; F05D 2260/22141; F05D 2260/607; Y02T 50/673; Y02T 50/676
  USPC .......................................................... 415/115
  See application file for complete search history.

(56) References Cited

U.S. PATENT DOCUMENTS

| | | | | |
|---|---|---|---|---|
| 4,416,585 A | | 11/1983 | Abdel-Messeh | |
| 4,419,044 A | * | 12/1983 | Barry | F01D 11/24 415/117 |
| 4,474,532 A | | 10/1984 | Pazder | |
| 4,497,610 A | * | 2/1985 | Richardson | F01D 9/04 415/116 |
| 4,515,526 A | | 5/1985 | Levengood | |
| 4,526,226 A | * | 7/1985 | Hsia | F01D 5/187 165/109.1 |
| 4,573,865 A | * | 3/1986 | Hsia | F01D 5/187 165/109.1 |
| 4,695,247 A | * | 9/1987 | Enzaki | F23R 3/06 431/352 |
| 4,775,296 A | | 10/1988 | Schwarzmann et al. | |
| 4,798,515 A | * | 1/1989 | Hsia | F01D 5/18 415/115 |
| 5,165,847 A | * | 11/1992 | Proctor | F01D 11/08 415/115 |
| 5,169,287 A | * | 12/1992 | Proctor | F01D 5/182 415/115 |
| 5,271,715 A | | 12/1993 | Zelesky et al. | |
| 5,273,396 A | * | 12/1993 | Albrecht | F01D 11/24 415/115 |
| 5,288,207 A | | 2/1994 | Linask | |
| 5,353,865 A | * | 10/1994 | Adiutori | F28F 13/02 165/109.1 |
| 5,395,212 A | | 3/1995 | Anzai et al. | |
| 5,533,864 A | | 7/1996 | Nomoto et al. | |
| 5,584,651 A | * | 12/1996 | Pietraszkiewicz | F01D 11/08 415/115 |
| 5,598,697 A | * | 2/1997 | Ambrogi | F23R 3/002 60/752 |
| 5,611,662 A | | 3/1997 | Cunha | |
| 5,615,546 A | | 4/1997 | Althaus et al. | |
| 5,681,144 A | | 10/1997 | Spring et al. | |
| 5,704,763 A | | 1/1998 | Lee | |
| 5,711,650 A | * | 1/1998 | Tibbott | F01D 5/186 415/115 |
| 5,964,575 A | * | 10/1999 | Marey | F01D 25/12 415/115 |
| 6,000,908 A | * | 12/1999 | Bunker | F01D 5/189 165/908 |
| 6,099,251 A | | 8/2000 | Lafleur | |
| 6,142,734 A | | 11/2000 | Lee | |
| 6,174,134 B1 | | 1/2001 | Lee et al. | |
| 6,254,346 B1 | | 7/2001 | Fukuno et al. | |
| 6,290,462 B1 | | 9/2001 | Ishiguro et al. | |
| 6,331,098 B1 | | 12/2001 | Lee | |
| 6,406,260 B1 | | 6/2002 | Trindade et al. | |
| 6,416,283 B1 | | 7/2002 | Johnson et al. | |
| 6,582,584 B2 | | 6/2003 | Lee et al. | |
| 6,607,355 B2 | | 8/2003 | Cunha et al. | |
| 6,609,884 B2 | | 8/2003 | Harvey | |
| 6,644,921 B2 | | 11/2003 | Bunker et al. | |
| 6,722,134 B2 | | 4/2004 | Bunker | |
| 6,779,597 B2 | * | 8/2004 | DeMarche | F01D 11/24 165/169 |
| 6,837,683 B2 | | 1/2005 | Dailey | |
| 6,890,154 B2 | | 5/2005 | Cunha | |
| 6,905,301 B2 | | 6/2005 | Tiemann | |
| 6,916,150 B2 | | 7/2005 | Liang | |
| 6,932,573 B2 | | 8/2005 | Liang | |
| 6,939,102 B2 | | 9/2005 | Liang | |
| 6,981,846 B2 | | 1/2006 | Liang | |
| 6,984,102 B2 | | 1/2006 | Bunker et al. | |
| 7,094,031 B2 | | 8/2006 | Lee et al. | |
| 7,104,757 B2 | | 9/2006 | Gross | |
| 7,128,533 B2 | | 10/2006 | Liang | |
| 7,137,781 B2 | | 11/2006 | Harvey et al. | |
| 7,182,576 B2 | | 2/2007 | Bunker et al. | |
| 7,186,084 B2 | | 3/2007 | Bunker et al. | |
| 7,195,458 B2 | | 3/2007 | Liang | |
| 7,219,498 B2 | * | 5/2007 | Hadder | F23R 3/007 60/752 |
| 7,300,242 B2 | | 11/2007 | Liang | |
| 7,300,251 B2 | * | 11/2007 | Kitamura | F01D 5/186 416/232 |
| 7,399,160 B2 | | 7/2008 | Harvey et al. | |
| 7,413,407 B2 | | 8/2008 | Liang | |
| 7,445,432 B2 | | 11/2008 | Levine et al. | |
| 7,520,723 B2 | | 4/2009 | Liang | |
| 7,534,089 B2 | | 5/2009 | Liang | |
| 7,547,191 B2 | | 6/2009 | Liang | |
| 7,597,533 B1 | * | 10/2009 | Liang | F01D 9/02 415/116 |
| 7,637,720 B1 | | 12/2009 | Liang | |
| 7,665,962 B1 | * | 2/2010 | Liang | F01D 11/24 415/173.1 |
| 7,665,965 B1 | | 2/2010 | Liang | |
| 7,690,892 B1 | | 4/2010 | Liang | |
| 7,699,583 B2 | | 4/2010 | Cunha | |
| 7,704,039 B1 | * | 4/2010 | Liang | F01D 9/04 415/116 |
| 7,713,026 B1 | | 5/2010 | Liang | |
| 7,722,327 B1 | | 5/2010 | Liang | |
| 7,766,616 B2 | | 8/2010 | Baldauf et al. | |
| 7,806,658 B2 | | 10/2010 | Liang et al. | |
| 7,824,156 B2 | | 11/2010 | Dellmann et al. | |
| 7,866,948 B1 | | 1/2011 | Liang | |

(56) References Cited

U.S. PATENT DOCUMENTS

| | | | |
|---|---|---|---|
| 7,938,624 B2 | 5/2011 | Tibbott | |
| 7,985,050 B1 | 7/2011 | Liang | |
| 8,353,663 B2* | 1/2013 | Arzel | F01D 5/08 |
| | | | 415/115 |
| 8,408,872 B2 | 4/2013 | Briggs et al. | |
| 8,439,639 B2 | 5/2013 | Joe et al. | |
| 8,596,963 B1* | 12/2013 | Liang | F01D 11/12 |
| | | | 29/889.22 |
| 8,814,507 B1* | 8/2014 | Campbell | F01D 5/08 |
| | | | 415/173.1 |
| 9,103,225 B2* | 8/2015 | Lutjen | F01D 11/08 |
| 9,574,455 B2* | 2/2017 | McCaffrey | F01D 11/127 |
| 9,657,642 B2* | 5/2017 | Kanjiyani | F01D 5/187 |
| 10,196,917 B2* | 2/2019 | Lutjen | F01D 11/08 |
| 10,309,255 B2* | 6/2019 | Romanov | F01D 25/12 |
| 2003/0035722 A1* | 2/2003 | Barrett | F01D 9/04 |
| | | | 415/200 |
| 2004/0146399 A1* | 7/2004 | Bolms | F01D 25/12 |
| | | | 415/175 |
| 2004/0211188 A1* | 10/2004 | Alkabie | F23R 3/002 |
| | | | 60/772 |
| 2005/0089393 A1* | 4/2005 | Zatorski | F01D 5/081 |
| | | | 415/115 |
| 2005/0135920 A1* | 6/2005 | Synnott | F01D 9/041 |
| | | | 415/115 |
| 2006/0099073 A1 | 5/2006 | Djeridane et al. | |
| 2006/0140753 A1* | 6/2006 | Romanov | F01D 11/08 |
| | | | 415/173.1 |
| 2007/0160475 A1* | 7/2007 | Rogers | F01D 5/186 |
| | | | 416/96 R |
| 2007/0243065 A1 | 10/2007 | Devore et al. | |
| 2007/0297916 A1 | 12/2007 | Levine et al. | |
| 2007/0297917 A1 | 12/2007 | Levine et al. | |
| 2008/0089780 A1* | 4/2008 | Erickson | F01D 11/24 |
| | | | 415/115 |
| 2008/0115506 A1 | 5/2008 | Patel et al. | |
| 2008/0131262 A1 | 6/2008 | Lee et al. | |
| 2008/0131264 A1* | 6/2008 | Lee | F01D 11/24 |
| | | | 415/116 |
| 2008/0187435 A1* | 8/2008 | Farah | F01D 9/04 |
| | | | 415/115 |
| 2008/0193278 A1* | 8/2008 | Erickson | F01D 11/24 |
| | | | 415/115 |
| 2009/0087312 A1 | 4/2009 | Bunker et al. | |
| 2010/0040480 A1 | 2/2010 | Webster et al. | |
| 2010/0143153 A1* | 6/2010 | Gross | F01D 5/187 |
| | | | 416/97 R |
| 2010/0221121 A1 | 9/2010 | Liang | |
| 2010/0226761 A1 | 9/2010 | Liang | |
| 2010/0226791 A1 | 9/2010 | Fujimura et al. | |
| 2010/0232929 A1* | 9/2010 | Joe | F01D 9/04 |
| | | | 415/1 |
| 2010/0247297 A1* | 9/2010 | Legare | F01D 11/24 |
| | | | 415/173.1 |
| 2010/0247328 A1 | 9/2010 | Cunha | |
| 2010/0303635 A1 | 12/2010 | Townes et al. | |
| 2011/0027102 A1 | 2/2011 | Nakamata et al. | |
| 2011/0038709 A1 | 2/2011 | Liang et al. | |
| 2011/0044802 A1* | 2/2011 | Di Paola | F01D 9/04 |
| | | | 415/173.1 |
| 2011/0164960 A1 | 7/2011 | Maldonado | |
| 2011/0188993 A1* | 8/2011 | Bacha | F01D 11/24 |
| | | | 415/115 |
| 2011/0229306 A1* | 9/2011 | Lewis | F01D 11/24 |
| | | | 415/115 |
| 2012/0057968 A1* | 3/2012 | Lee | F01D 11/08 |
| | | | 415/178 |
| 2012/0177478 A1 | 7/2012 | Giri et al. | |
| 2012/0251295 A1* | 10/2012 | Turner | F01D 11/24 |
| | | | 415/115 |
| 2013/0081401 A1 | 4/2013 | Kim | |
| 2014/0037429 A1* | 2/2014 | Okita | F01D 5/186 |
| | | | 415/115 |
| 2014/0109577 A1* | 4/2014 | Lee | F01D 9/023 |
| | | | 60/722 |
| 2014/0286751 A1* | 9/2014 | Brunelli | F01D 11/24 |
| | | | 415/116 |
| 2014/0321965 A1* | 10/2014 | Rana | F01D 5/187 |
| | | | 415/1 |
| 2016/0319698 A1* | 11/2016 | Romanov | F01D 25/12 |

FOREIGN PATENT DOCUMENTS

| | | |
|---|---|---|
| EP | 2087206 B1 | 3/2010 |
| EP | 2172708 A2 | 4/2010 |
| EP | 2235328 A1 | 10/2010 |
| EP | 2505787 A1 | 10/2012 |
| EP | 2538137 A2 | 12/2012 |
| EP | 2549188 A2 | 1/2013 |
| EP | 2573464 A2 | 3/2013 |
| EP | 2700877 A2 | 2/2014 |
| EP | 2778369 A1 | 9/2014 |
| JP | 03182602 A | 8/1991 |
| JP | 08338202 A | 12/1996 |
| JP | 3040590 B2 | 5/2000 |
| JP | 3124109 B2 | 1/2001 |
| JP | 3586637 B2 | 11/2004 |
| WO | 2011156078 A1 | 12/2011 |
| WO | 2013123115 A1 | 8/2013 |

OTHER PUBLICATIONS

European Search Report and Opinion issued in connection with Related EP Application No. 15169174.8 dated Oct. 28, 2015.

PCT Search Report and Written Opinion issued in connection with corresponding Application No. PCT/US2015/032592 dated Oct. 29, 2015.

PCT Search Report and Written Opinion issued in connection with Related Application No. PCT/US2015/057577 dated Jan. 14, 2016.

PCT Search Report and Written Opinion issued in connection with Corresponding Application No. PCT/US2015/032597 dated Feb. 25, 2016.

PCT Search Report and Written Opinion issued in connection with Related Application No. PCT/US2015/057708 dated Jun. 17, 2016.

Canadian Office Action issued in connection with Related CA Application No. 2893058 dated Mar. 3, 2016.

International Search Report and Written Opinion issued in connection with corresponding PCT Application No. PCT/US2015/032598 dated Feb. 25, 2016.

* cited by examiner

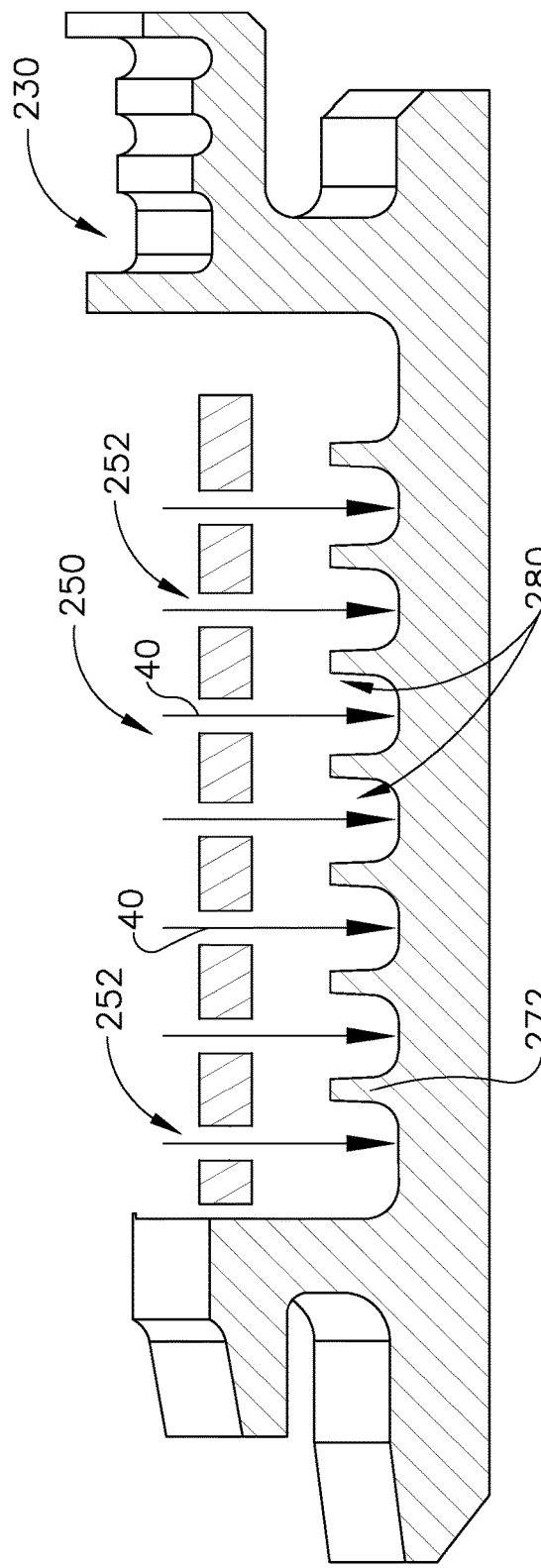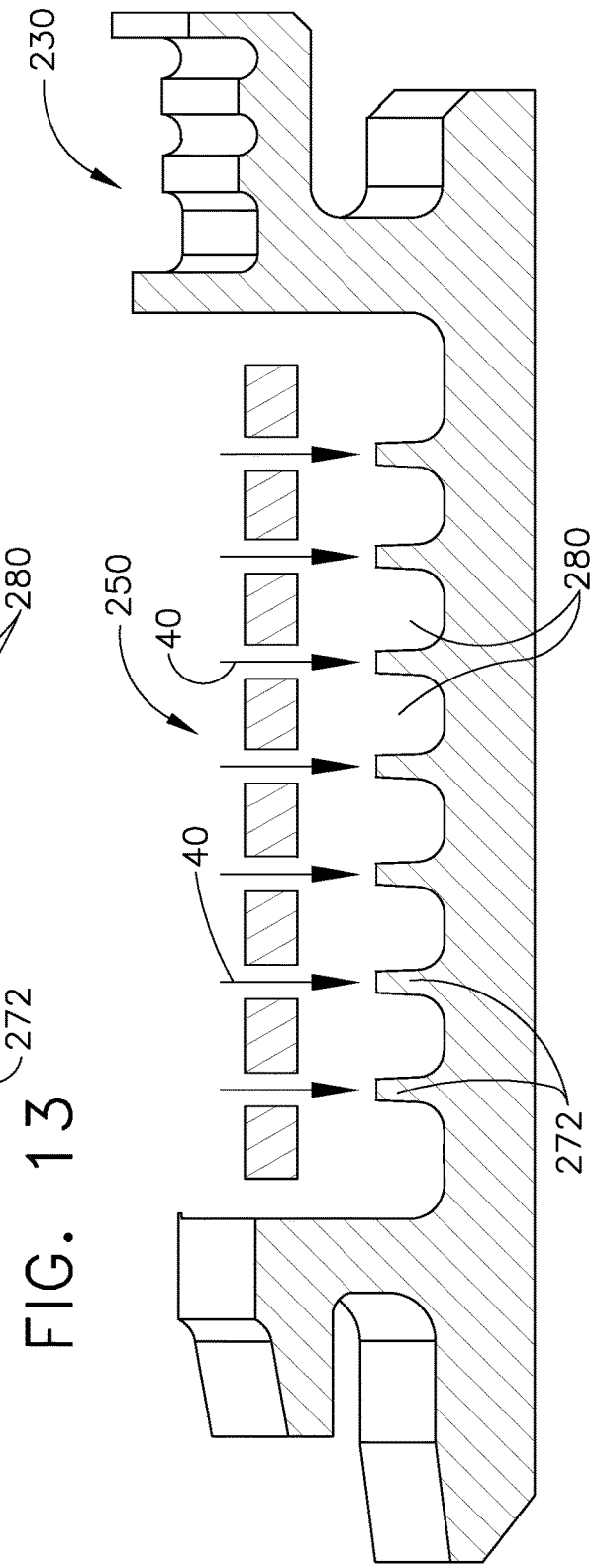

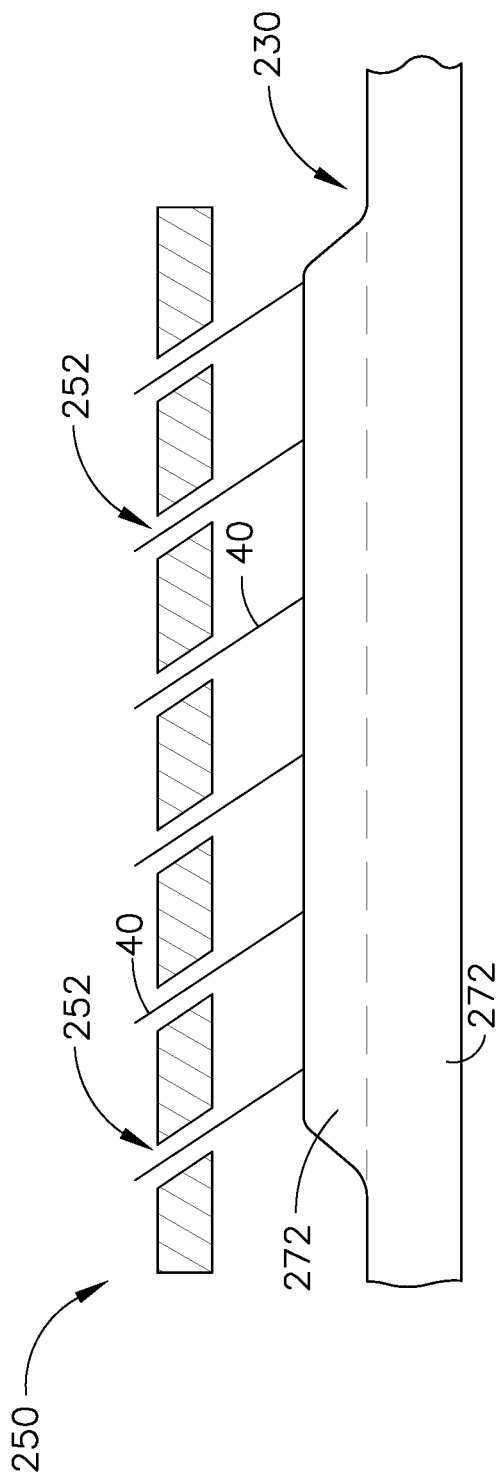
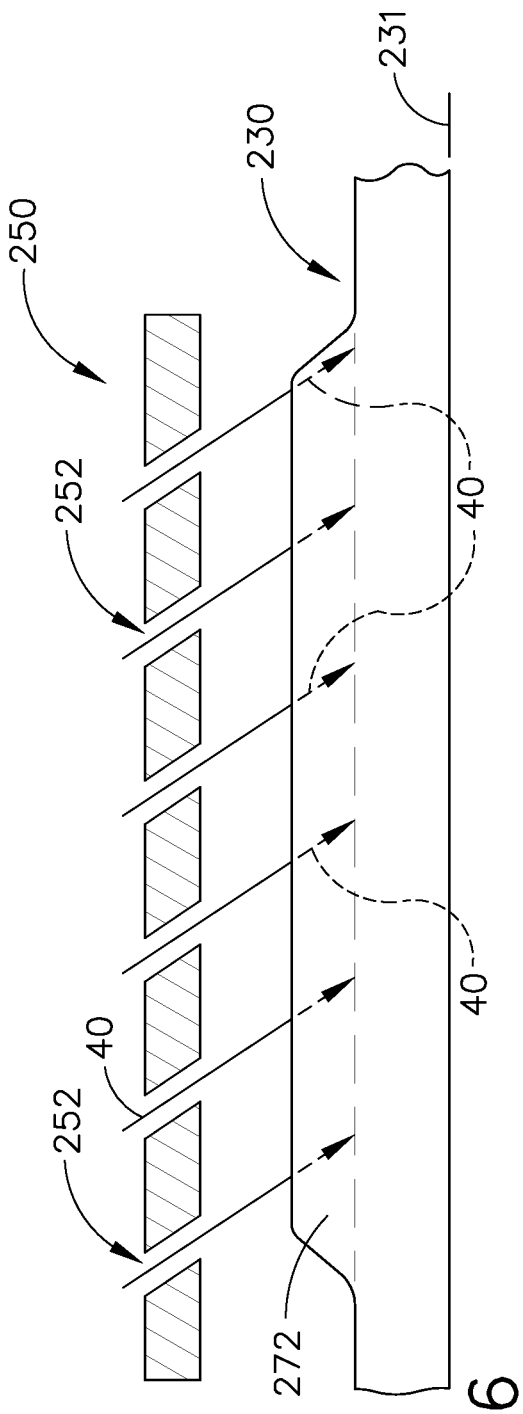

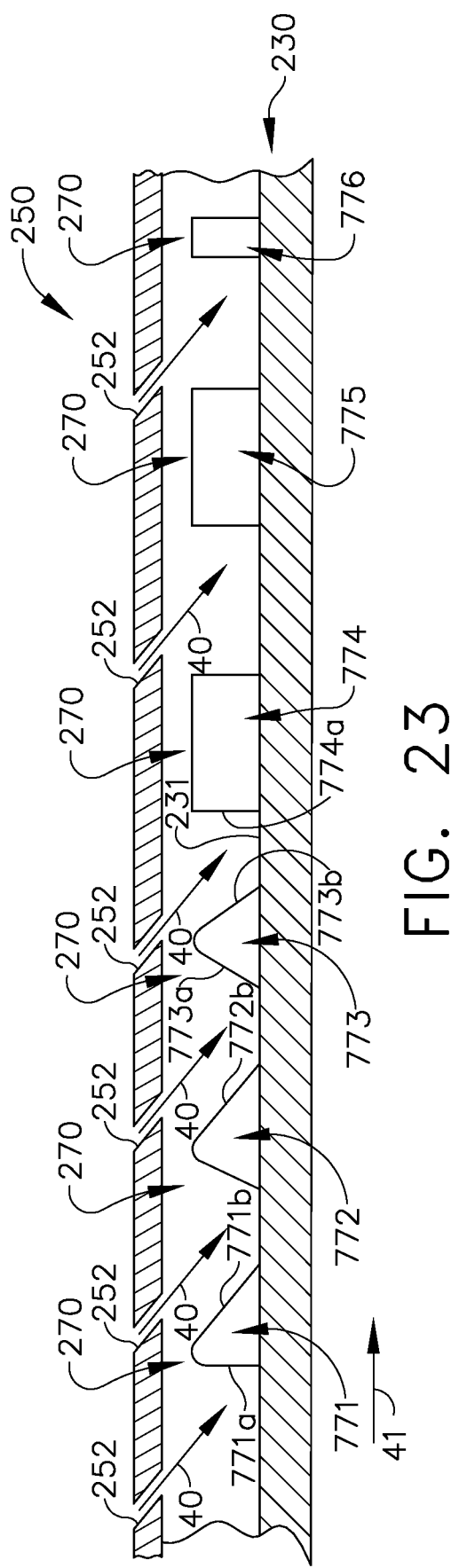
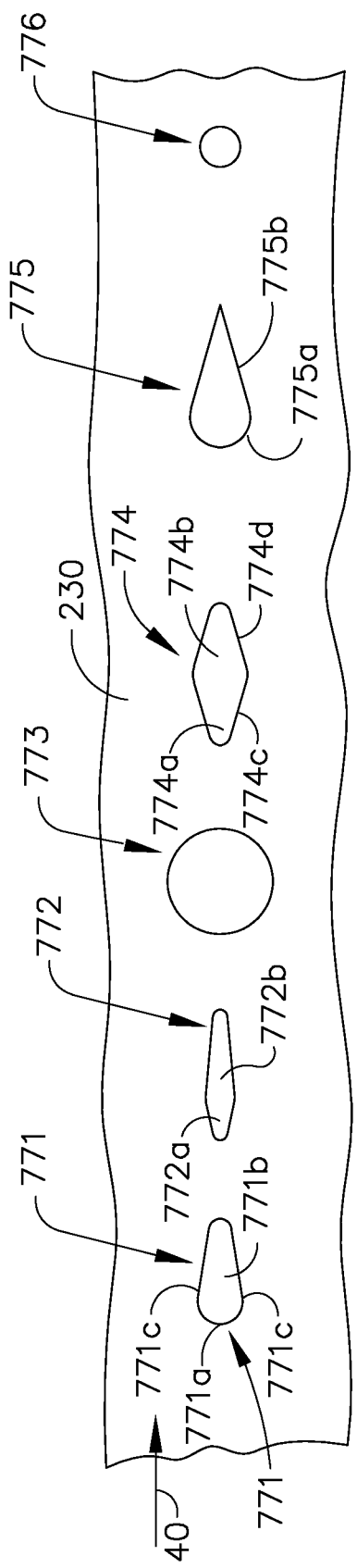
FIG. 23
FIG. 24

ENGINE COMPONENTS WITH IMPINGEMENT COOLING FEATURES

BACKGROUND

Present embodiments relate to angled impingement openings for impingement cooling of a gas turbine engine component. More specifically, present embodiments relate to, without limitation, an array of openings disposed at an angle to a surface to provide angled impingement flow of cooling fluid through cooling channels and into features defining the channels.

Most operating environments of a gas turbine engine receive particulate material into the engine. Such particulate can have various detrimental effects in the engine.

The accumulation of dust, dirt or other particulate matter in gas turbine engines or turbo-machinery reduces the efficiency of the machinery, as well as reducing the effectiveness of the cooling which occurs within the engine. The particulate may insulate components of the engine which lead to the increasing component temperature therein. Particulate can also block or plug apertures utilized for cooling components within the engine which further leads to decreased functionality or effectiveness of the cooling circuits within the engine components or hardware.

Accumulation of particulate is in part due to stagnation and/or recirculation of air flow within cooling circuits. Prior efforts to resolve particulate accumulation problems have included additional flow through the engine components so as to increase surface cooling. This has deemphasized internal cooling feature effectiveness but utilizes more compressed air which would alternatively be directed into the core for improving performance and output of the gas turbine engine.

It would be desirable to reduce or eliminate the factors leading to the increased temperature or decreased cooling effectiveness of the engine components. It would further be desirable to decrease the amount of particulate accumulation and decrease stagnation or low momentum of air flow so that particulate does not accumulate in the aircraft engine.

The information included in this Background section of the specification, including any references cited herein and any description or discussion thereof, is included for technical reference purposes only and is not to be regarded subject matter by which the scope of the invention is to be bound.

SUMMARY

According to some embodiments, an engine component assembly is provided with angled impingement cooling and opposed channel cooling features. The engine component comprises a cooled surface having a cooling fluid flow path on one side thereof and a second component adjacent to the first component. The second component, for example an insert, may have a plurality of openings forming an array wherein the openings extend through the second component at a non-orthogonal angle to the surface of the second component. Additional channel-shaped cooling features are positioned on the first engine component cooled surface and the impingement cooling flows may be aimed at the cooling features or between the cooling features.

According to some embodiments, an aircraft engine component with particulate mitigation features, comprises an engine component having a cooled surface, the cooled surface having a plurality of channels defined by substantially continuous walls, the engine component having a flow path on one side of the surface, an insert disposed adjacent to the engine component and in flow communication with the flow path, the insert having a plurality of openings forming an array through the insert, the openings extending through the insert at a non-orthogonal angle to the surface of the insert and, the openings aimed at one of the plurality of channels and the substantially continuous walls.

According to some embodiments, an engine component assembly is provided with counterflow impingement cooling. The engine component comprises an engine component cooling surface having a cooling fluid flow path on one side thereof and a second component adjacent to the first component. The second component, for example an insert, may have a plurality of openings forming an array wherein the openings extend through the second component at a non-orthogonal angle to the surface of the second component. The array of openings create counterflows in substantially opposite directions along the engine component cooling surface. Additional cooling features may be added to the engine component cooling surface and the impingement cooling counterflows may be aimed at the cooling features or between the cooling features.

According to some embodiments, an engine component assembly with impingement cooling counterflow comprises an engine component having a cooled surface, the engine component having a cooling fluid flow path on one side of the cooled surface, an insert disposed adjacent to the engine component between the cooling fluid flow path and the engine component, the insert having a plurality of openings through the insert forming an array, the cooling fluid flow path passing through the plurality of openings to cool the cooled surface, the openings defining an array extending through the insert at non-orthogonal angles to the insert surface, the array including at least one first row of the openings at a first non-orthogonal angle to the insert surface, the array including at least one second row of the openings, adjacent to the first row, the openings of the second row being disposed at a second non-orthogonal angle to the insert surface and, the insert array creating a counterflow of impingement cooling wherein the cooling fluid flow path passing through the first row moves in a first direction along the cooled surface and the cooling fluid flow path passing through the second row moves in a second direction along the cooled surface substantially opposite the first direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

The above-mentioned and other features and advantages of these exemplary embodiments, and the manner of attaining them, will become more apparent and the methods and material for forming an angled impingement insert with channel cooling features will be better understood by reference to the following description of embodiments taken in conjunction with the accompanying drawings, wherein:

FIG. 13 is a section view of a first embodiment wherein the cooling flow path engages the surface of the engine component;

FIG. 14 is a section view of a second embodiment wherein the cooling flow path engages the top surfaces of walls of the cooling features;

FIG. 15 is a side section view corresponding to the view of FIG. 14;

FIG. 16 is a side view corresponding to the view of FIG. 13;

FIG. 23 is a side section view of the counterflow impingement cooling arrangement of FIG. 22 including cooling features on an opposed engine component;

FIG. 24 is a top view of the cooling features of FIG. 23;

DETAILED DESCRIPTION

Figure 1:
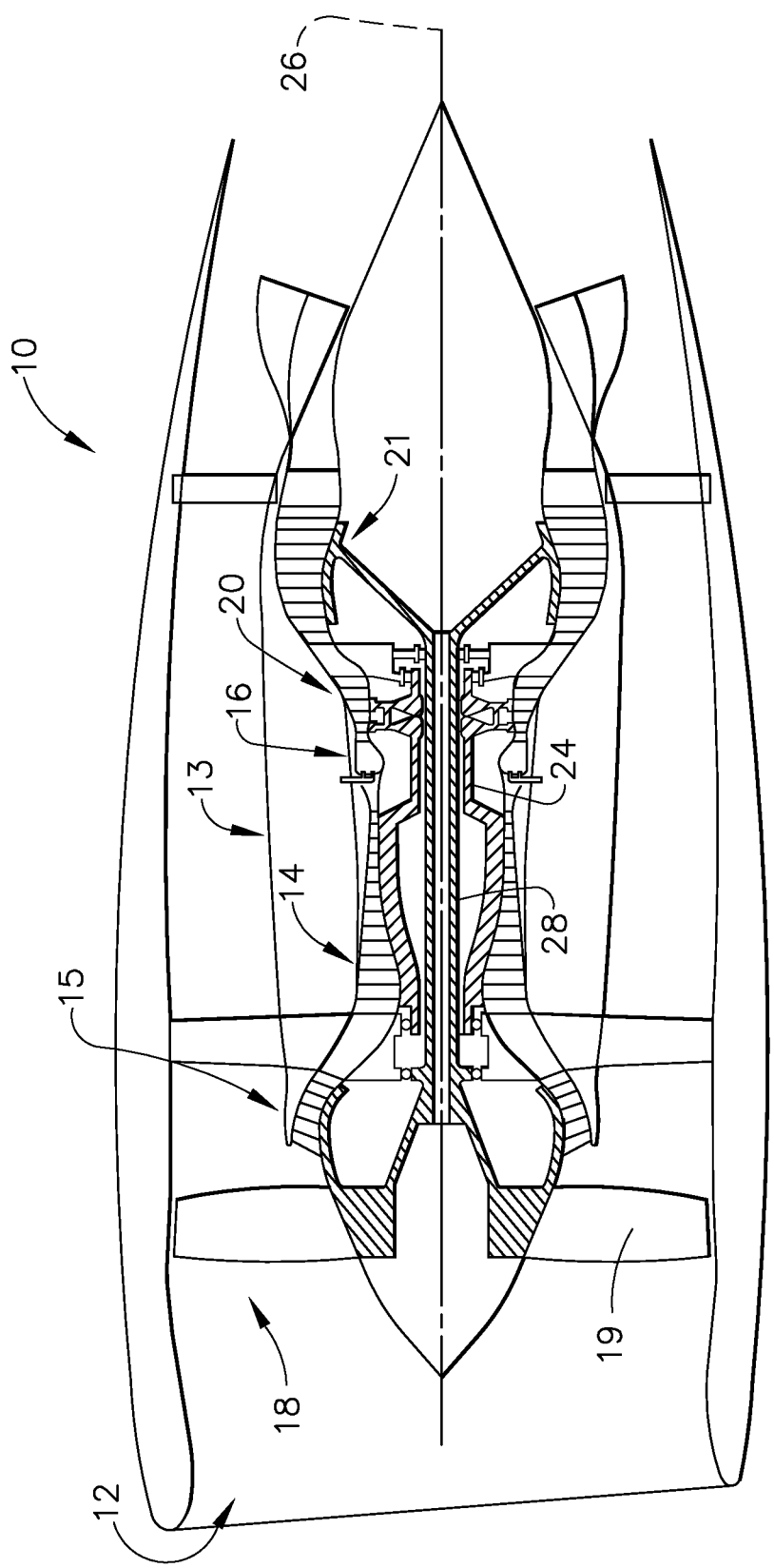
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring now to FIGS. 1-32, various views are depicted which teach impingement inserts which reduce stagnation regions and therefore, particulate accumulation or build-up within an engine component. As a result, engine cooling may be improved. Present embodiments relate to gas turbine engine components which utilize an insert to provide cooling air along a cool side surface of an engine component. The insert provides an array of cooling holes or apertures which are facing the cool side surface of the engine component and direct cooling air onto that cool side surface. The apertures may be formed in arrays and are directed at an oblique angle or a non-orthogonal angle to the surface of the insert and further may be at an angle to the surface of the engine component being cooled. The engine component being cooled may further comprise a plurality of walls defining channels wherein the impingement cooling air is aimed. As a result, particulate accumulation within the engine component may be reduced. The present embodiments may be applied to first stage and second stage nozzles for example, as well as shroud hanger assemblies or other components or combinations that utilize impingement cooling and/or are susceptible to particulate build-up resulting in reduced cooling capacity, including but not limited to combustor liners, combustor deflectors and transition pieces. Various combinations of the depicted embodiments may be utilized to form the particulate accumulation mitigation features described further herein.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine center line.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown having an engine inlet end 12 wherein air enters a propulsor 13, which is defined generally by a multi-stage compressor, including for example a low pressure compressor 15 and a high pressure compressor 14, a combustor 16 and a multi-stage turbine, including for example a high pressure turbine 20 and a low pressure turbine 21. Collectively, the propulsor 13 provides power during operation. The gas turbine engine 10 may be used for aviation, power generation, industrial, marine service or the like. The gas turbine engine 10 is axis-symmetrical about engine axis 26 so that various engine components rotate thereabout. In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of a shaft 24.

The engine 10 includes two shafts 24, 28. The axis-symmetrical shaft 24 extends through the turbine engine 10, from the forward end to an aft end for rotation of one or more high pressure compressor stages 14. The shaft 24 is supported by bearings along its length. The shaft 24 may be hollow to allow rotation of the second shaft 28, a low pressure turbine shaft therein. The shaft 28 extends between the low pressure turbine 21 and a low pressure compressor 15. Both shafts 24, 28 may rotate about the centerline axis 26 of the engine. During operation the shafts 24, 28 rotate along with other structures connected to the shafts such as the rotor assemblies of the turbine 20, 21, compressor 14, 15 and fan 18 in order to create power or thrust depending on the area of use, for example power, industrial or aviation.

Referring still to FIG. 1, the inlet 12 includes a turbofan 18 which includes a circumferential array of exemplary blades 19 extending radially outward from the root. The turbofan 18 is operably connected by the shaft 28 to the low pressure turbine 21 and creates thrust for the turbine engine 10.

Within the turbine areas 20, 21 are airfoils which are exposed to extremely high temperature operating conditions. It is desirable to increase temperatures in these areas of the gas turbine engine as it is believed such increase results in higher operating efficiency. However, this desire to operate at high temperatures is bounded by material limitations in this area of the engine. Turbine components are cooled to manage these material limits. For example, shrouds adjacent to rotating blades of the turbine or compressor may require cooling. Additionally, nozzles which are axially adjacent to the rotating blades may also require cooling. Still further, the combustor structures which hold the flame and combustion product gases may be cooled with impingement cooling. These components are collectively referred to as first engine components.

Figure 2:
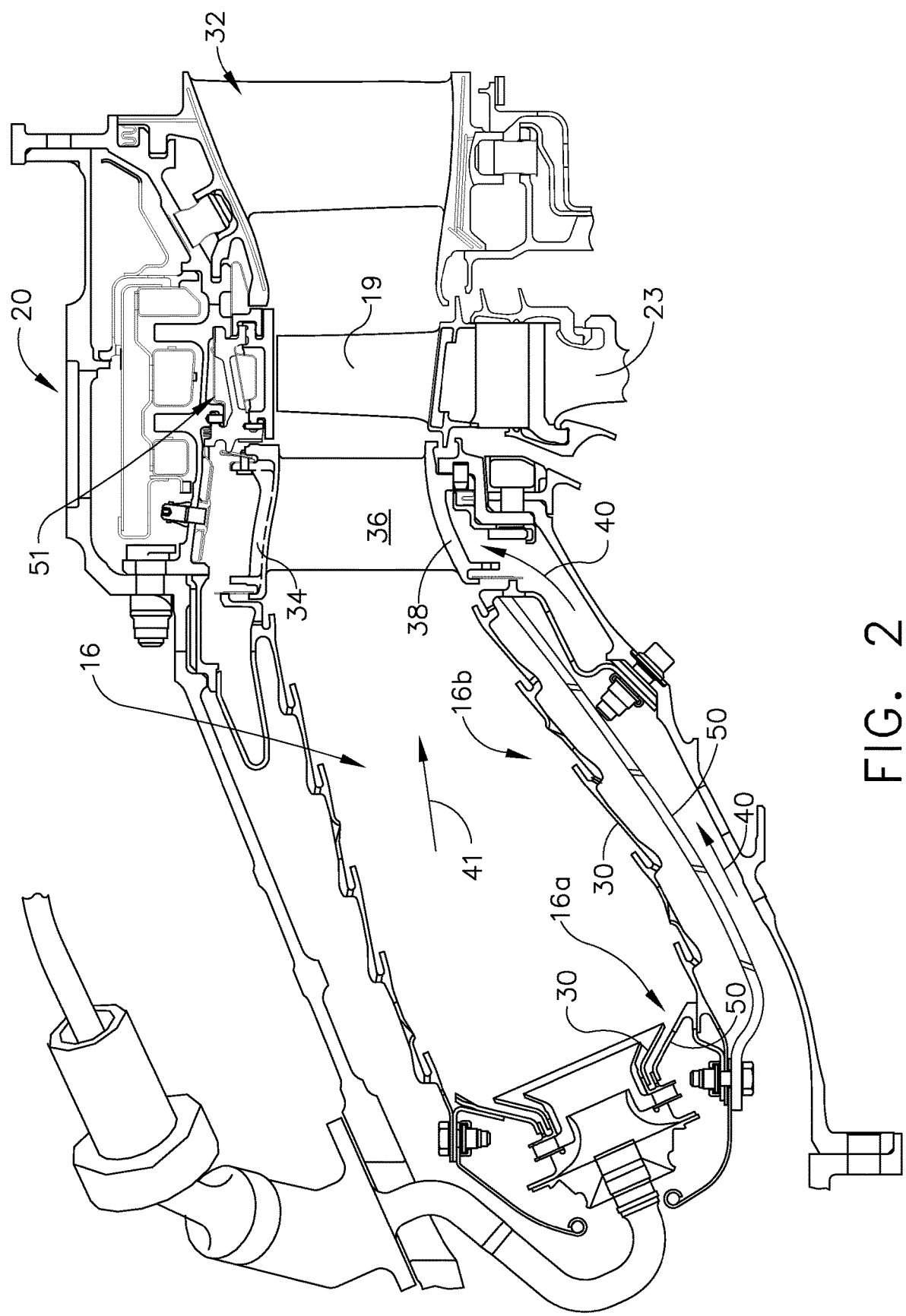
FIG. 2 is a side section view of a portion of a propulsor including a combustor and a turbine.

Referring now to FIG. 2, a side section view of a combustor 16 and high pressure turbine 20 is depicted. The combustor 16 is shown having various locations wherein impingement embodiments may be utilized. For example, one skilled in the art will realize upon review of this disclosure that the impingement embodiments defined by first and second components may be used in the area of the deflector 16a or the combustor liner 16b.

The turbine 20 includes a number of blades 19 which are connected to a rotor disc 23 which rotates about the engine center line 26 (FIG. 1). Adjacent to the turbine blades 19 in the axial direction is a first stage nozzle 30 which is formed of the rotating blade 19 of turbine 20. The turbine 20 further comprises a second stage nozzle 32 aft of the blade 19. The nozzles 30, 32 turn combustion gas for delivery of the hot working fluid to the turbine to maximize work extracted by the turbine 20, 21. The nozzle 30 includes an outer band 34, an inner band 38 and an airfoil 36. A cooling flow circuit or flow path 40 passes through the airfoil 36 to cool the airfoil as combustion gas 41 passes along the exterior of the nozzle 30. One area within a gas turbine engine where particulate accumulation occurs is within the nozzle 30, 32 of the turbine 20. The internal cooling circuit 40 which reduces temperature of the components can accumulate particulate and decrease cooling. The exemplary nozzle 32 may acquire particulate accumulation and therefore, mitigation features described further herein may be utilized in a high pressure turbine stage one nozzle 30 or stage two nozzle 32. However, this is non-limiting and the features described may be utilized in other locations as will be discussed further. Additionally, as described further, shroud assembly 51 may require cooling due to the turbine operating conditions.

Figure 3:
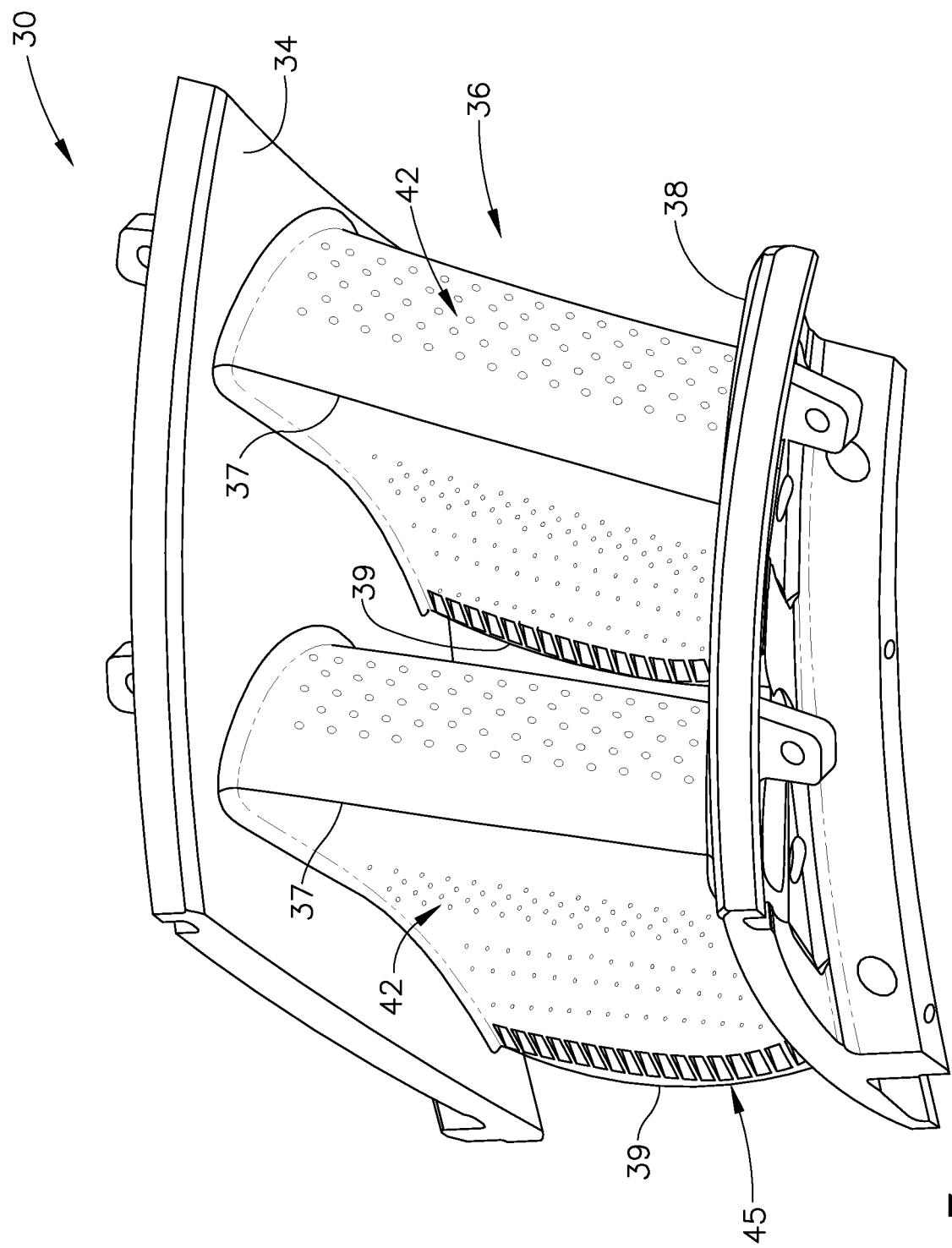
FIG. 3 is an isometric view of an exemplary nozzle utilized in the turbine.

Referring now to FIG. 3, an isometric view of an exemplary nozzle 30 is depicted. The nozzle includes the outer band 34 and the inner band 38, between which an airfoil 36 is located. The airfoil 36 may be completely or at least partially hollow and provide the air flow path or circuit 40 (FIG. 2) through such hollow portion of the airfoil. The airfoil 36 includes a leading edge 37, a trailing edge 39 and a radially outer end and radially inner end. The outer surface of the nozzle receives combustion gas 41 (FIG. 2) from the combustor 16 (FIG. 1). The inner surface of the airfoil 36 is cooled by the cooling flow path 40 to maintain structural integrity of the nozzle 30 which may otherwise be compromised by the high heat in the turbine 20. The outer band 34 and inner band 38 are located at the outer end and inner end of the airfoil, respectively.

The exterior of the airfoils 36 may be formed with a plurality of cooling film holes 42 which form a cooling film over some or all of the airfoil 36. Additionally, the airfoil 36 may include apertures 45 at the trailing edge 39.

Figure 4:
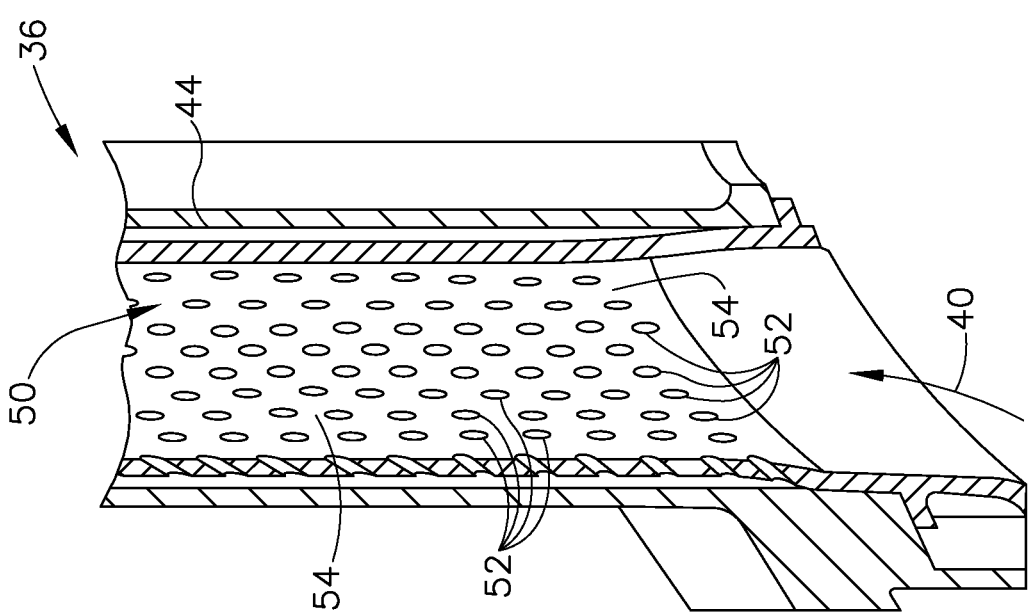
FIG. 4 is a partial section view of an exemplary nozzle.

Referring now to FIG. 4, a partial section view of the nozzle 30 is depicted through a radial section to depict the interior area of the airfoil 36. In this view, the inner or cooling surface of the airfoil 36 is shown. The inner surface 44 is disposed adjacent to the cooling flow path 40. As used with respect to the cooling flow path, the term "adjacent" may mean directly near to or indirectly near to. Within the airfoil 36 is an insert 50 which receives air flow 40 through the hollow space of the airfoil 36 and directs the air flow outwardly to an interior surface of the airfoil 36. An insert 50 may be inserted inside another component, or being inserted between two parts. The insert 50 is made with multiple cooling holes or apertures 52 that allow fluid to flow through the insert 50. Further, the inserts 50 may be generally sealed around a perimeter to the part being cooled, and therefore, all of the fluid flows through the holes and none goes around the insert. Alternatively, the insert 50 may not be completely sealed and therefore allows some preselected amount of cooling flow path 40 air to bypass the impingement holes 52. The insert flow area and pressure ratio is such that the fluid is accelerated through each impingement cooling hole or aperture 52 to form a cooling impingement jet. The insert 50 is disposed adjacent to the cooling flow path 40, between the cooling flow path 40 and the interior airfoil surface 44 according to one embodiment. The insert 50 includes a plurality of cooling holes or openings 52. The insert 50 directs such cooling air to the airfoil 36 by way of the plurality of openings or cooling holes 52 located within the insert 50. The openings 52 define at least one array 54. The term "array" is utilized to include a plurality of openings which may be spaced both uniformly from one another and non-uniformly at varying distances. An array 54 of holes or apertures formed in an insert 50 is present if in at least the two-dimensional case, e.g. a plane, it requires both X and Y coordinates in a Cartesian system to fully define and locate the hole placements with respect to one another. Thus an array requires the relative spacings in both dimensions X and Y. This plane example could then be understood as applying also to curved inserts as the array is located on the surface curvature. A grouping of holes or apertures would then comprise any array or a portion of an array, especially if the spacings, hole diameters, orientations, and angles are changing from one hole to another, from one row of holes to another, or even from one group of holes to another. A pattern ensues when the same qualifiers are repeated over a number of holes, rows, or groups. Additionally, the arrays 54 may be arranged in groups or patterns wherein the patterns are either uniformly spaced or non-uniformly spaced apart.

Each of the openings 52 extends through the insert 50 at a preselected angle. The angle of each cooling opening may be the same or may vary and may further be within a preselected range as opposed to a specific angle. For example, the angle may be less than 90 degrees. The openings may be in the same or differing directions. The insert 50 directs the cooling air to the cold surface of the airfoil 36, that is the interior surface 44 for example, which is opposite the combustion gas or high temperature gas path 41 traveling along the exterior of the nozzle 30 and airfoil 36.

Figure 7:
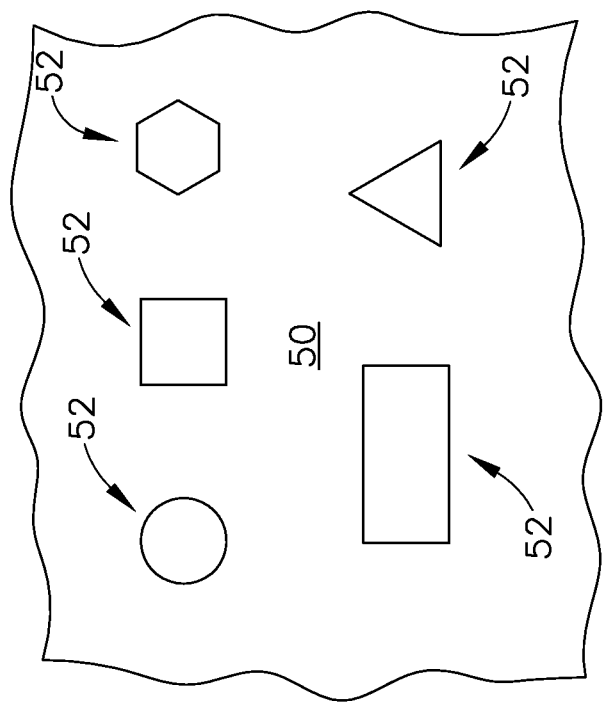
FIG. 7 is a view of various cross-sections of cooling hole openings which may be used with instant embodiments.

Further, the apertures 52 may be formed in a plurality of shapes and sizes. For example any or various closed boundary shapes may be utilized, including but not limited to circular, oblong, polygon, By polygon, any shape having at least three sides and three angles may be utilized. Further, the angles may include radiuses or fillets. According to some embodiments, the apertures are all of a single size. According to other embodiments, the apertures 52 may be of differing sizes. Further, the cross-sectional shapes of the apertures may all be of a single shape or vary in shape. As shown in FIG. 7, a plurality of cross-sectional shapes are shown as exemplary apertures 52 which may be utilized. The sizes and shapes may be tuned to provide the desired cooling or the desired air flow usage through the insert to the inside or cold surface of the airfoil 36. By tuned, it is meant that the sizes and/or shapes may be varied to obtain a desired cooling and/or reduction of particulate build up.

Figure 5:
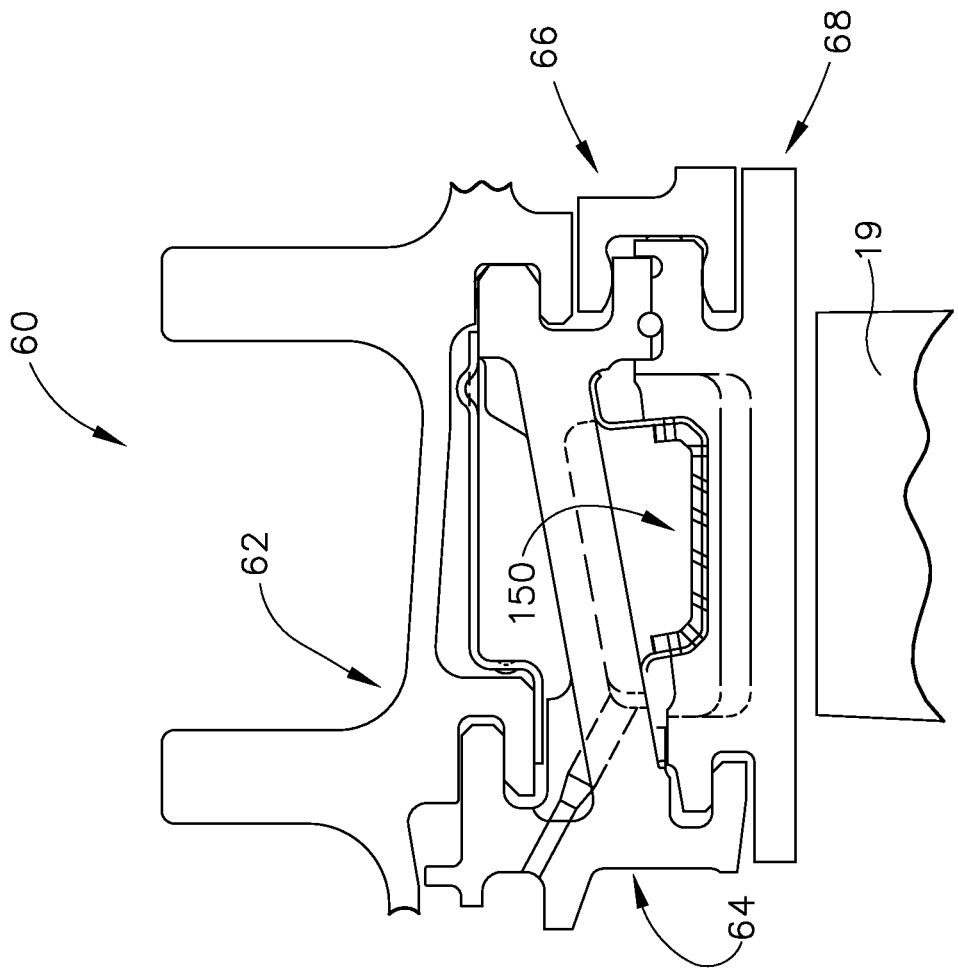
FIG. 5 is a side section view of an alternative embodiment of the angled impingement structure.

According to the embodiments shown in FIG. 5, an alternate utilization of the exemplary particulate mitigation structure is provided. According to this exemplary embodiment, a shroud hanger assembly 60 is shown having an interior insert 150 which cools a cold side of a shroud by way of impingement cooling. The shroud hanger assembly 60 comprises a hanger 62 that includes a first hanger portion 64 and a second hanger portion 66. The hanger portions 64, 66 retain a shroud 150 in position, adjacent to which a blade 19 rotates. It is desirable to utilize cooling fluid moving within or defining the cooling flow path or circuit to reduce the temperature of the insert 150 by way of impingement cooling. However, it is known for prior art shroud hanger assemblies to incur particulate accumulation within this insert area and on the cooling surface of the shroud 68 which over time reduces cooling capacity of the cooling fluid. According to the instant embodiments, the insert 150 may include the plurality of apertures which are angled or non-orthogonal to the surface of the insert and surface of the shroud. In this embodiment, the array 54 of apertures 52 are angled relative to the surface of the insert and the opposite surface of the shroud to limit particulate accumulation in this area of the gas turbine engine.

Figure 6:
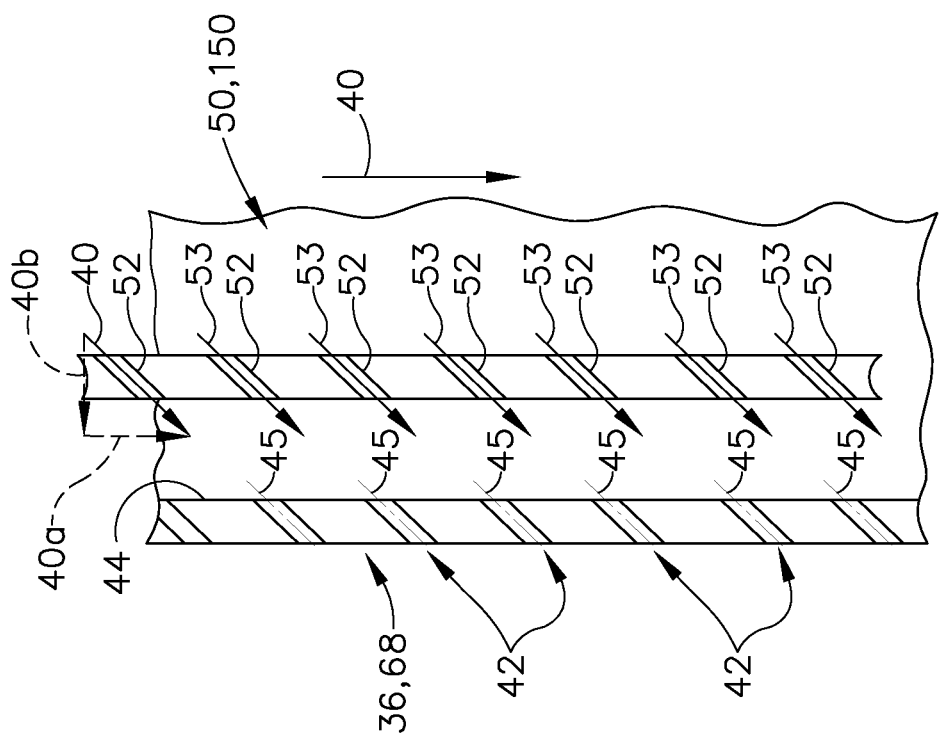
FIG. 6 is a schematic view of the angled impingement of a second component on a first component.

Referring now to FIG. 6, a schematic view of the angled impingement configuration is depicted. The first engine component 30 may be the airfoil nozzle 36 or shroud 68 according to some embodiments. The insert 50, 150 may be the second engine component. The angle of the aperture 52 is defined by an axis 53 extending through the aperture 52. The axis 53 may be angled with the inner or cooled surface 44 or may be aligned or may be unaligned with film holes 42. The holes 42 and cooling aperture 52 may be aligned where the axis 53 of the cooling aperture passes through the cooling film hole 42 or crosses the axis 43 of the cooling film hole at or near the cooling film hole. Alternatively, the axis 53 may not be aligned with the cooling holes 42 so as to impinge the surface 44.

Additionally shown in this view, the relationship of aperture length-to-diameter ratio may be discussed. The insert 50 may have thickness generally in a horizontal direction for purpose of the description and exemplary depiction. It has been determined that increasing the thickness of the insert may improve the desirable aperture length to diameter ratio which will improve performance. Conventional inserts have aperture length-to-diameter ratios generally of less than 1. For the purpose of generating and forming a fluid jet that has a well-defined core region with minimal lateral spreading, the length-to-diameter ratios of angled apertures are desired to be in the range of 1 to 10, and more specifically in the range of 1 to 5. To comply with other desirable engine metrics such as weight and aperture, length-to-diameter ratios in the range of 1 to 2.5 are frequently more desirable. The length that is used in this length-to-diameter ratio is defined as the portion of the aperture centerline axis that maintains a complete perimeter for the cross section taken perpendicular to the axis. Further, the thickness of the insert 50 may be constant or may vary. Still further, it will be understood by one skilled in the art that the aperture cross section may change in area as a function of its length while keeping the same basic shape, i.e. it may expand or contract. Accordingly, the aperture axis may define a somewhat or slightly arcuate line, not necessarily a perfectly straight line.

The cooling fluid or cooling air flow 40 is shown on a side of the airfoil 36 and also adjacent to the insert 50, 150. The insert 50 includes an array defined by the plurality of apertures 52 located in the insert and which direct the air outwardly at an angle relative to the inside surface of the component 50, 150. The nozzle 30 may also comprise a plurality of cooling holes 42 which may be at an angle to the surface as depicted but may be at any angle to the nozzle surface. With this embodiment, as with the previous embodiment, the array of cooling openings may be of various sizes and shapes wherein the apertures may be uniformly spaced or may be non-uniformly spaced and further wherein the pattern or arrays may be uniformly spaced or non-uniformly spaced apart. The cooling apertures 52 may also be of one uniform cross-sectional shape or of varying cross-sectional shapes and further, may be of uniform size or varying size or formed in a range of sizes.

Also shown in FIG. 6, is the passage of the cooling air 40 through one of the apertures 52. This is shown only at one location for sake of clarity. The flow of cooling fluid 40 is made up of two components. The first axial component 40a may be an average fluid velocity tangent to the cooled surface 44. The second radial component 40b may be an average fluid velocity normal to the cooled surface 44. These two components 40a, 40b are not shown to scale but define the vector of the cooling fluid 40 exiting the cooling apertures 52. The components 40a, 40b may also define a ratio which may be between 0 and 2. According to some embodiments, the ratio may be between 0.3 and 1.5. According to still further embodiments, the ration may be between 0.5 and 1.

Additionally, it should be understood by one skilled in the art that the cooling apertures 52, 152 or others described may be aimed in three dimensions although only shown in the two dimensional figures. For example, a cooling aperture 52 or any other embodiment in the disclosure may have an axis 53 which generally represents the cooling flow 40 passing through the aperture. The axis 53 or vector of the cooling flow 40 through the aperture 52 may be defined by at least two components, for example a radial component (40b) and at least one of a circumferential or axial component (40a). The vector may be aimed additionally by varying direction through the third dimension, that is the other of the circumferential or axial dimension, some preselected angular distance in order to provide aiming at a desired location on the surface of the opposed engine component, or a specific cooling feature as discussed further herein. In the depicted embodiment, the third dimension, for example the circumferential dimension, may be into or out of the page.

Figure 8:
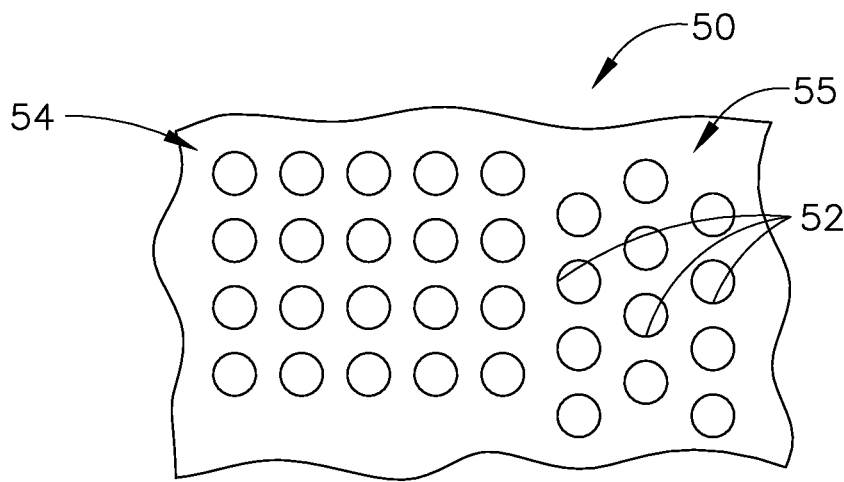
FIG. 8 is a view of an array including uniformly spaced apertures which may or may not be staggered.

Referring now to FIG. 8, a view of an exemplary second component surface is depicted, for example component 50 or 150. The surface includes an array 54 of apertures 52. The array 54 may be formed of rows of apertures 52 extending in first and second directions. According to one embodiment, the array 54 is shown having a uniform spacing of apertures 52. The apertures 52 in one direction, for example, the left to right direction shown, may be aligned or alternatively may be staggered so that holes in every other row are aligned. The staggering may occur in a second direction, such as a direction perpendicular to the first direction. A plurality of these arrays 54 may be utilized on the insert 50 or a mixture of arrays 54 with uniform size and/or shape may be utilized. A single array may be formed or alternatively, or a plurality of smaller arrays may be utilized along the part. In the instant embodiment, one array 54 is shown with uniform spacing and hole size and shape, on the left side of the figure. On the right side of the figure a second array 55 is shown with apertures 52 of uniform spacing, size and shape, but the rows defining the array 55 are staggered or offset.

Figure 9:
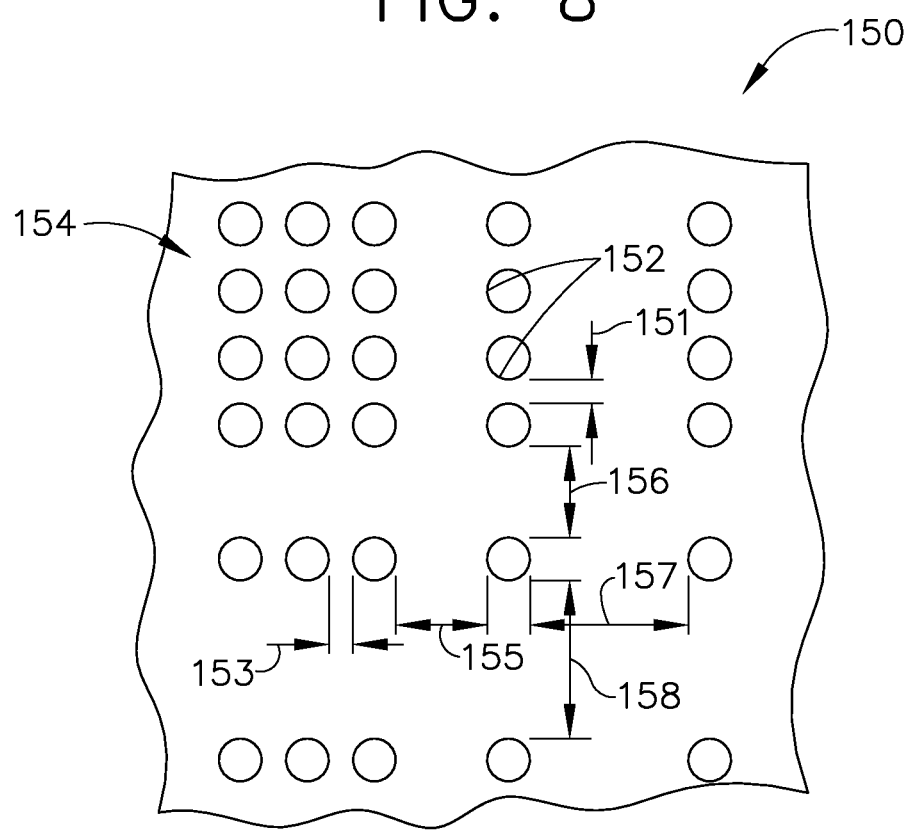
FIG. 9 is a view of an array including non-uniformly spaced apertures.

With reference to FIG. 9, a plurality of arrays is again shown. However, in this embodiment the arrays 154 are non-uniformly spaced apart and additionally, the apertures 52 may be non-uniformly spaced apart. Such spacing may be dependent upon locations where cooling is more desirable as opposed to utilizing a uniformly spaced array which provides generally equivalent cooling at all locations.

The array 154 has a first plurality of apertures 152 which are spaced apart a first distance 153. The apertures 152 are additionally shown spaced apart a second distance 155 which is greater than distance 153. The apertures 152 have a further spacing distance 157 which is greater than spacings 153 and 155. All of these spacings are in the first direction. Further the spacing of apertures 152 may vary in a second direction. For example, the apertures 152 are shown with a first spacing 151, 156 and 158 all of which differ and all of which therefore vary row spacing of the array 154.

Thus, one skilled in the art will appreciate that, regarding these embodiments, the arrays 154 of apertures 152 may be formed in uniform or non-uniform manner or a combination thereof. It should be understood that non-uniform apertures may form arrays which are arranged in generally uniform spacing. Similarly, the apertures may be uniformly spaced and define arrays which are non-uniform in spacing. Therefore, the spacing of apertures and arrays may or may not be mutually exclusive. Still further, the apertures 152 may be formed of same or varying sizes and cross-sectional areas as previously described.

Figure 10:
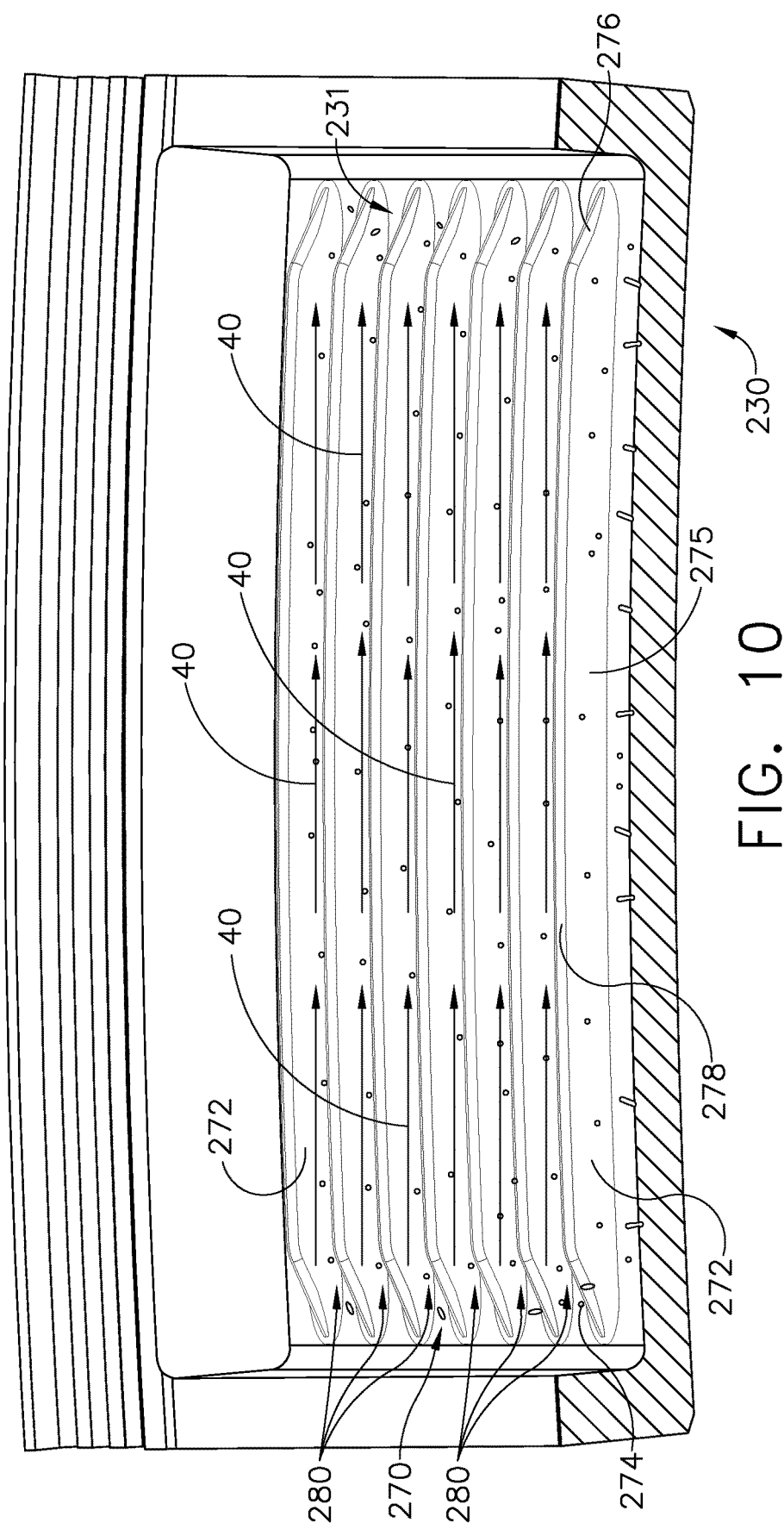
FIG. 10 is an upper isometric view of an engine impingement cooling arrangement on the first engine component.

Referring now to FIG. 10, an upper isometric view of a further alternative embodiment of the first engine component 230 is shown. The first engine component 230 receives cooling fluid flow from the second engine component (not shown) so that the first engine component is cooled. According to this embodiment, the engine component 230 is shown having a plurality of cooling features 270 defined by continuous or piecewise continuous walls 272. The walls 272 have a width and a height extending from the cooling surface 231 of the component 230. The width and height may be generally close to a 1:1 ratio, although some embodiments may differ. Width is measured as the base dimension where the feature meets the surface 231 and height is measured as the centerline dimension of the generally symmetric feature shape from the base to the top of the feature. The width-to-height ratio may be in the range of about 1:1 to about 1:5. However, the length dimension measured from left to right in the depicted embodiment may be much greater than the width or height of the wall 272. For example, the length of the wall 272 may be at least 10 times greater than the width or the height of the wall 272 whereas the fins or previous cooling features 270 may have had a length which was up to 7 times longer than the width or height of the fin or feature. Thus, the wall 272 is termed "continuous" or at least "piecewise continuous" wherein multiple walls are positioned in adjacent relationship to define a longer total wall length.

The walls 272 and channels 280 may extend in a plurality of directions. The walls 272 may extend in an axial direction or a circumferential direction. The walls 272 and therefore channels 280 may have components in combinations of these directions as well.

The wall 272 may have a first surface 274 and a second surface 276 which taper or curve from the surface 231. Extending between the surfaces 274, 276 is an upper edge or surface 278. The walls 272 may further comprise side surfaces 275 which may be linear, curvilinear or some combination thereof or may be comprised of multiple segments of linear, curvilinear, arcuate or combinations thereof. Additionally, in embodiments where the width varies, the surfaces 275 may be tapered from wider heights/elevation to narrower height/elevation. The walls 272 define a plurality of channels 280 extending therebetween.

As discussed further, the impingement flow passes through the second engine component and engages the plurality of cooling features either directly or impinges the surface 231 of the engine component 230. Various embodiments of such are described herein. The channels 280 create pathways for flow of cooling fluid 40 to remove heat from the first engine component 230. Alternatively, the paths of cooling fluid may impinge upon the walls 272 and travel along the surfaces, top or sides of the walls 272 rather than through the channels 280 between the walls 272.

Figure 11:
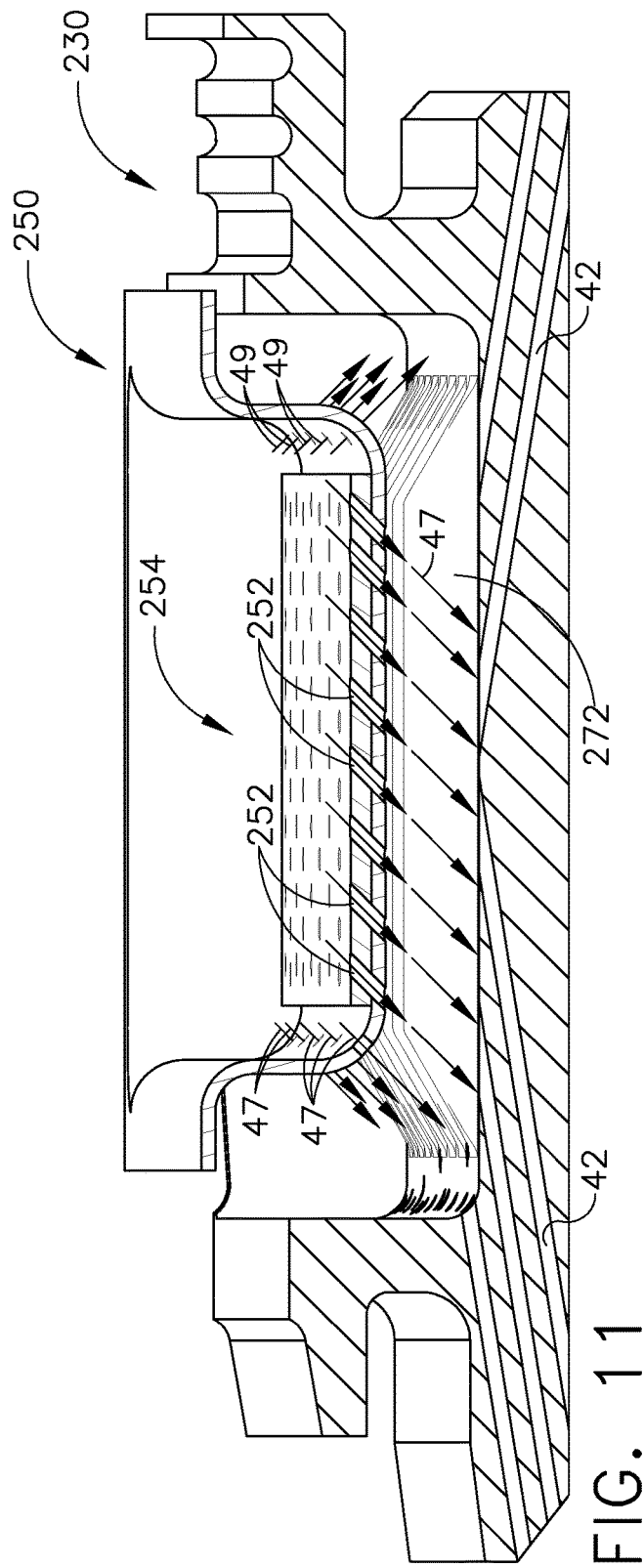
FIG. 11 is a side section view of an embodiment of the first engine component having the channel cooling features.

Referring now to FIG. 11, a section view of the first engine component 230 and second engine component 250 is depicted. The second engine component 250 may be an insert which includes a plurality of impingement cooling apertures 252 including arrangements and embodiments of any of the previous embodiments or combinations. The second engine component 250 is disposed adjacent to the first engine component 230, with a gap therebetween, and receives cooling flow path 40 defined by flow in a first direction 47 and a second direction 49. The cooling fluid, for example compressed air, in the cooling air flow path 40 passes through the impingement cooling holes 252 to the first engine component 230. The second engine component 250 includes a plurality of angled impingement cooling holes 252 as previously described. The impingement cooling holes 252 define an array 254 wherein adjacent rows direct air toward the first engine component 230. The rows of apertures 252 depict direct air flow in the first direction 47. An adjacent row of apertures 252 direct the cooling flow in the second direction 49 and the pattern continues so as to provide counter or opposite flows in adjacent rows through the array 254.

Figure 17:
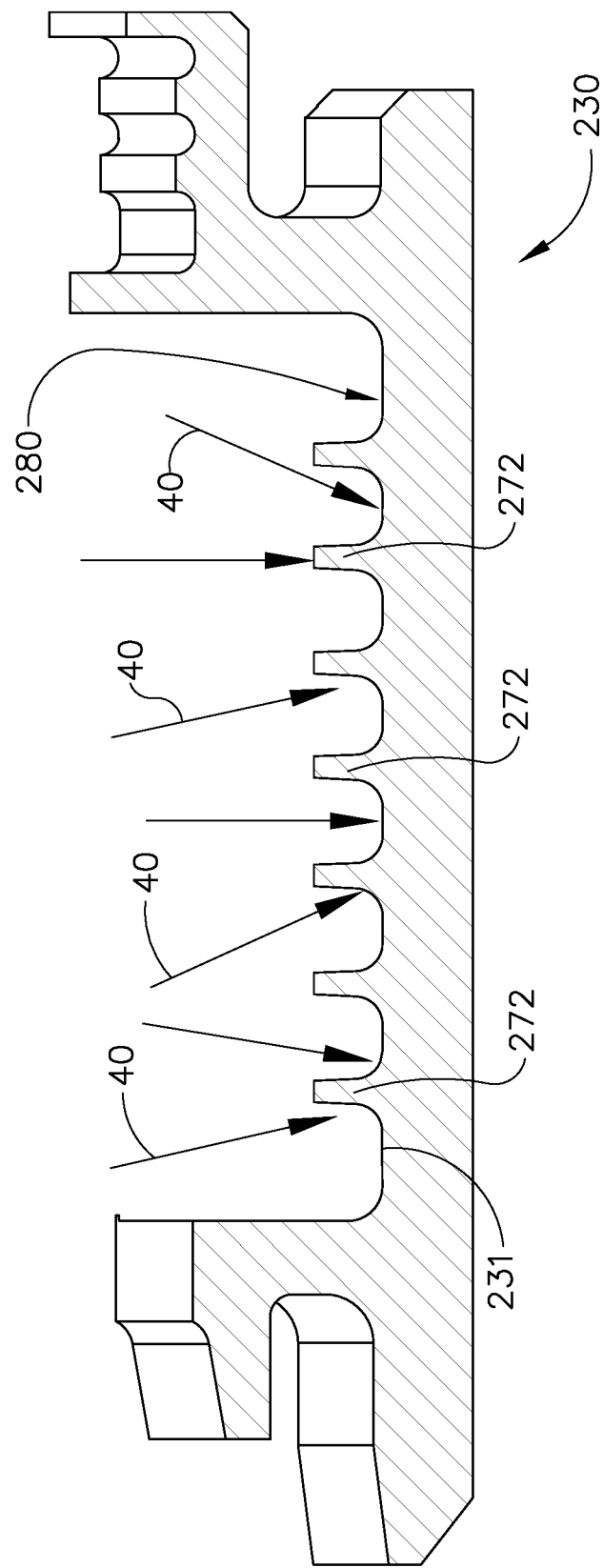
FIG. 17 is a section view of a further embodiment of impingement.

Along the cooling surface of the first component 230, are a plurality of continuous walls 272 which define rows of channels 280 (FIG. 17). The channels 280 and walls 272 may extend in the axial direction as shown or alternatively, may extend in the circumferential direction.

The second engine component 250 is depicted in the exemplary view as an upper horizontal structure in the figure and includes a plurality of angled cooling apertures 252 extending through the component 250. These may take any of the various forms as previously described as related to the individual holes 252 and as related to the groups of holes 252 and the component 250, for example insert, is not limited to a horizontal structure and is not limited to a flat plate form. Additionally, the second engine component 250 may not be limited to a constant thickness but instead may vary thickness and may or may not be flat.

Figure 12:
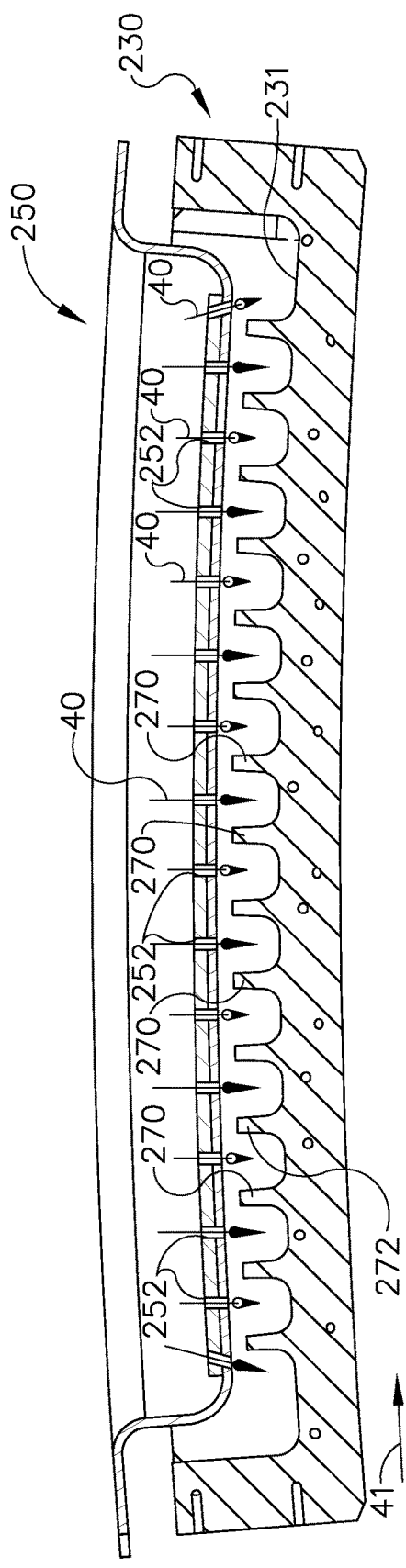
FIG. 12 is an alternative section view of FIG. 10 wherein the section is perpendicular to that shown in FIG. 11.

Referring now to FIG. 12, a section view of the embodiment of FIG. 10 is shown with the section taken in a perpendicular direction to that of the previous FIG. 11. The view clearly depicts that the walls 272 and channels 280 therebetween. Additionally, the fluid flows 40 are shown passing through the second engine component 250 and impinging the first component 230. The fluid flows 40 are shown passing in a radial direction in the depicted embodiment. However, the fluid paths 40 may be at an angle to the purely radial direction so as to partially extend in the circumferential direction, axial direction or some combination thereof Accordingly, the cooling fluid provides cooling for the first engine component as well as a reduction of stagnation areas and reduced particulate accumulation therein.

It should be understood that while a turbine shroud is depicted, the cooling features 270 and angled impingement cooling may alternatively be utilized with any of various engine components 230 including, but not limited to, nozzle airfoils, turbine shrouds, transitions, combustor deflectors and combustor liners and other parts wherein cooling may be desirable due to operating conditions within the gas turbine engine.

In the depicted embodiment, beneath the cooling apertures 252 and spaced opposite the first component 230, which may represent the insert, is the first component 230. A hot combustion gas path 41 is shown passing along a hot surface, for example the lower surface of component 230. On the upper surface of the component 230 is a cooling surface 231 which is impingement cooled. The first engine component 230 includes a plurality of discrete cooling features 270 which extend from cooling surface 231 the first engine component 230 toward the second engine component 250. The discrete cooling features 270 may take various shapes, geometries, forms and various types are shown extending from the cooling surface 231 of the engine component 230 into the gap between engine components 230, 250. For example, the cooling features 270 may vary in width or have a constant width. Further, the cooling features 270 may have a length wherein the length and height are substantially equal or not substantially equal. The length may be up to about 7 times the height according to some embodiments but may be of shorter length-to-height ratio. The side view may be polygon, cylindrical, triangular or other shapes, any of which may include sharp corners or alternatively, may have curved or radiused corners in order to improve aerodynamics. By polygon, it is meant that the cooling features 270 have at least three straight sides and angles as shown in side view. Similarly, fillets or corner radii may be utilized where the features 270 meet the component 230.

According to some embodiments, the features 270 extend from the engine component 230 toward the insert 250. Additionally, while the embodiments shown heretofore have been related primarily to nozzles and shrouds, it is within the scope of the instant disclosure that the structure may further comprise other engine components which are cooled by way of impingement cooling within a gas turbine engine.

Referring now to FIG. 13, a circumferential view is depicted wherein the first component 230 is shown beneath the second component 250. The second engine component 250 includes a plurality of apertures 252. In the depicted view, the angle of the apertures 252 is such that the flow path of cooling air 40 is directed in a circumferential direction and radially into the first engine component 230. The flow path 40 impinges along the cooled surface 231 between cooling features 270. The cooling features 270 define channels 280 wherein the cooling airflow 40 passes. However as described previously, the flow path may be aimed through three dimensions.

With reference now to FIG. 14, an embodiment is shown having the first engine component 230 and the second engine component 250 as previously described. However, in this embodiment, the apertures 252 are arranged such that the impingement cooling flow 40 impinges upon the walls 272.

Referring now to FIG. 15, a further embodiment is provided to show a further alternative or addition to the previously described embodiments. In the embodiment of FIG. 15, the view is shown in a side section rather than circumferentially sectioned. As a result, the wall 272 is shown. The apertures 252 of the second engine component 250 are angled so that the air flow impinges upon the wall 272 at an angle. The apertures 252 may be spaced directly above the wall 272 or alternatively, may be offset in the axial direction and angled to provide that the impingement flow 40 impinges upon the wall 272.

With reference now to FIG. 16, an alternate embodiment is shown wherein the angled fluid flow 40 similar to FIG. 15 has a circumferential component. However, the flow 40 travels between the walls 272 and impinges upon the floor 231 of the first engine component 230.

It should be clear to one skilled in the art that any or all of these embodiments may be utilized in combination or as alternatives to one another. Therefore, no single description should be considered limiting in any way. The angle of the fluid flow 40 may vary in three-dimensions in order to aim the fluid flow 40 to a desired position either on or into the walls 272 or within the channels 280.

With reference now to FIG. 17, a circumferential section view is shown of a first engine component 230. Various fluid flows 40 are shown extending and impinging the engine component 230 in a variety of manners. Moving from left to right across the view, the first fluid flow 40 impinges the surface 231 of the component 230. The second and third fluid flows 40 have an engine axial component such that they move in the figure from left to right some amount. One fluid flow may impinge upon the wall 272 while an alternate fluid flow 40 may impinge on the surface 231 within the channel 280.

Two additional fluid flows 40 are shown with axial components such that the angle of the flow may have some component moving in the aft to forward direction. Again one flow is shown impinging upon the wall 272 while an alternate may impinge upon the surface 231. It should be clear to one skilled in the art that the cooling flow 40 may move between the walls 272 or through the channels 280 which may be provided with two dimensions of aiming. A third dimension of aiming is capable as previously described from the cooling apertures 252 to provide more precise locating of the cooling flow 40.

Figure 18:
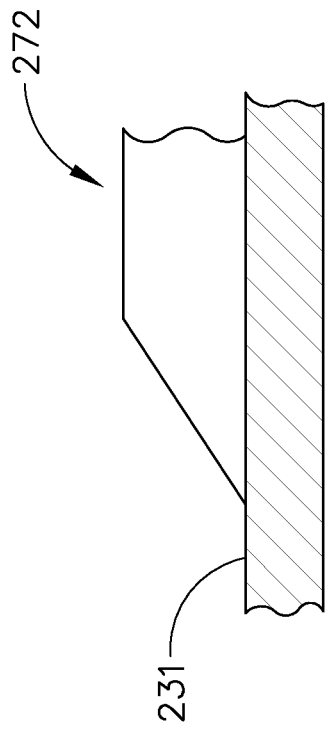
FIG. 18 is a side view of one profile embodiment of an end of a cooling feature wall.
Figure 19:
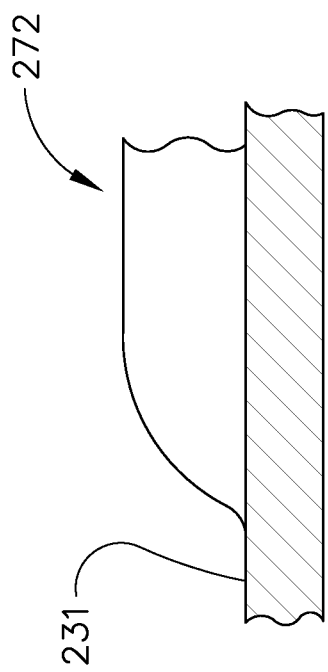
FIG. 19 is a side view of a second profile embodiment of an end of a cooling feature wall.

Referring now to FIGS. 18-21, various embodiments are shown of profiles which may be utilized to define the walls 272. With reference now to FIG. 18, a first end profile of wall 272 is shown wherein the end tapers from the surface 231 upward in a curvilinear or arcuate fashion. With reference to FIG. 19, the taper is formed with a linear segment.

Figure 20:
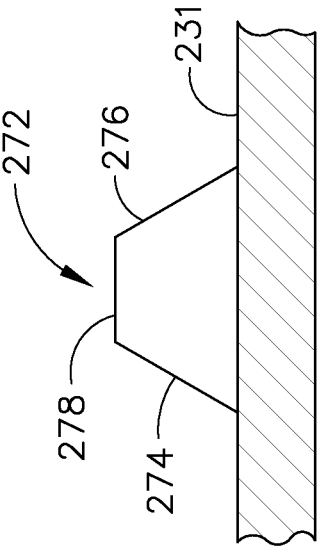
FIG. 20 is an end view of an embodiment of a profile of a cooling feature wall.
Figure 21:
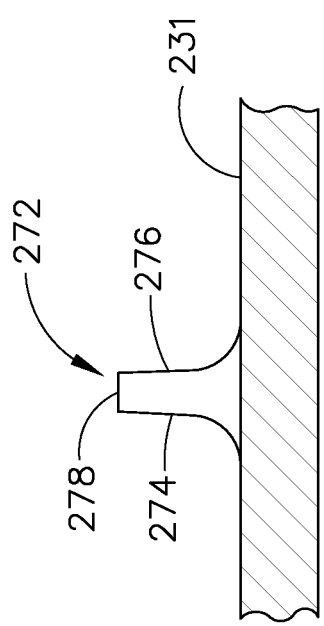
FIG. 21 is an end view of a second embodiment of a profile of a cooling feature wall.

With reference to FIGS. 20 and 21, circumferential section views are shown which may be utilized to form the wall 272. With reference first to FIG. 20, a first surface 274 and a second surface 276 extend from the component cooled surface 231 in a radial direction to an upper surface 278. These surfaces may be curvilinear, arcuate or linear.

With reference to FIG. 21, an alternate embodiment is shown wherein the wall surfaces 274, 276 are linear and the upper surface 278 is also linear forming a frustoconical shape section view. While these embodiments are depicted, it should be understood by one skilled in the art that they are merely exemplary and not limiting and other cross-sectional shapes may be utilized to form the walls as well as the end arrangements or tapers shown in FIGS. 18, 19.

Figure 22:
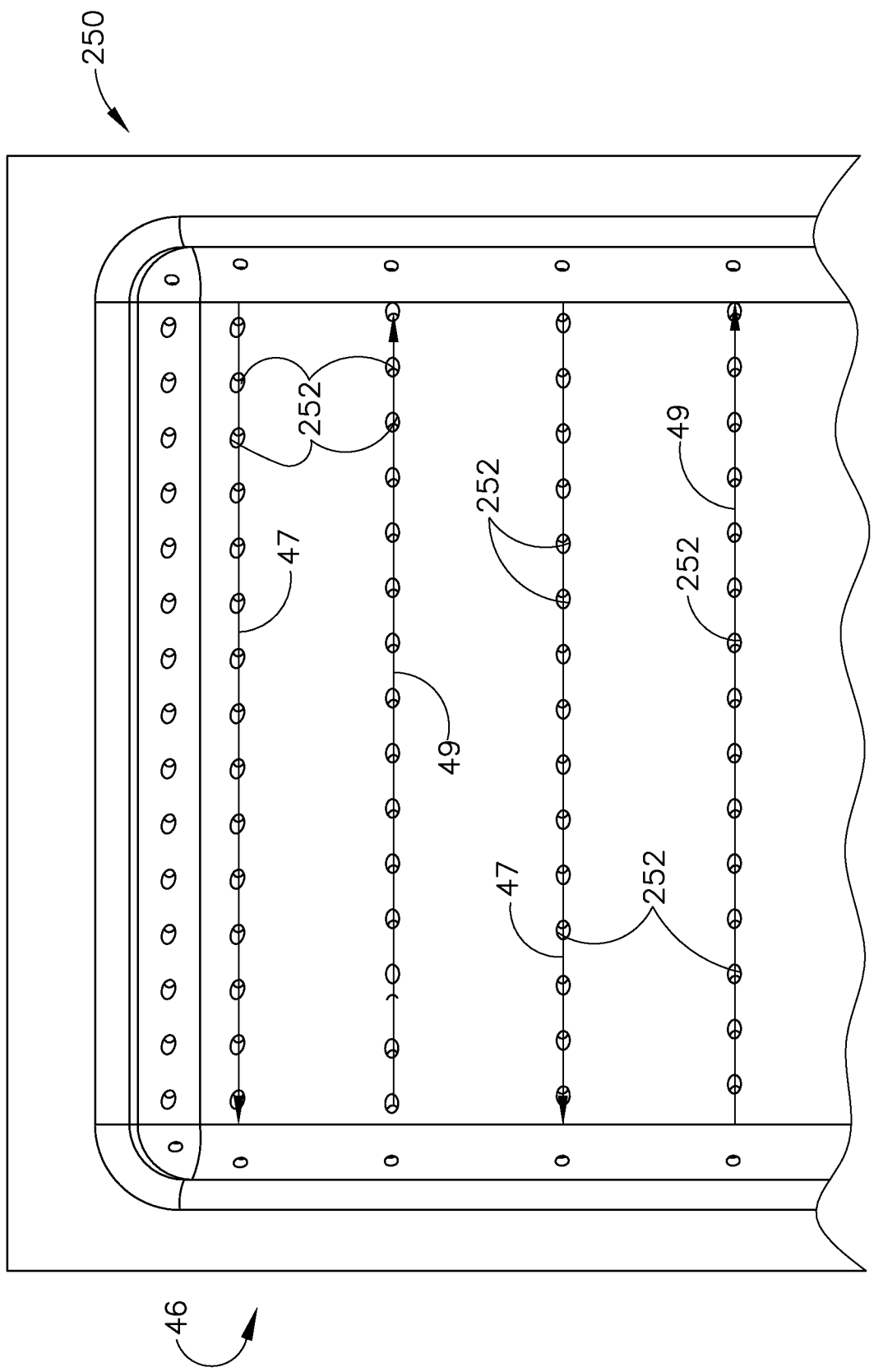
FIG. 22 is top view of a counterflow impingement cooling arrangement on a engine component.

Referring now to FIG. 22, a top view of an embodiment of the counterflow impingement cooling engine component assembly is shown. In the depicted embodiment, the second engine component 250 may be an insert for cooling a shroud, for non-limiting example. The second engine component 250 which further comprises a plurality of angled impingement cooling holes 252 to allow air passage through the component 250 and provide impingement cooling to a first engine component 230 (FIG. 23). Any of the previously described arrangements of impingement cooling holes and configurations thereof may be utilized with the instant counterflow cooling impingement embodiment. The present embodiment provides that angled cooling holes 252 create counterflows 46 of cooling fluid in opposed directions along the first engine component 230. The figure depicts a counterflow 46 which comprises a first flow direction or component 47 and a substantially opposite second flow direction or component 49. These substantially opposite flows are adjacent to one another and created by the plurality of apertures 252. The counterflow 46 is directed toward an adjacent first engine component 230 shown, for example in FIG. 23, to create opposed flow directions along the engine component 230 and provide cooling therefore, as well as reduction of stagnation areas and reduced dust or particulate accumulation therein.

Additionally, it should be understood that through the aiming of cooling apertures 252, as described with reference to FIG. 6, within a specific row, the cooling flows 40 which defined either of counterflow directions 47 and 49 may be aimed at the same angle to produce each of the flow directions 47, 49 or alternatively, may be at different angles but still produce the overall flow directions 47, 49, creating the counterflow. For example, the angle of cooling apertures may vary by as much as 45 degrees from the desired overall direction 47 or direction 49. More particularly, this off-angle alignment may be up to about 20 degrees from the desired overall direction 47, 49.

The counterflow 46 of the instant embodiment may be utilized on any of various engine components 230 which may include, but are not limited to, nozzle airfoils, turbine shrouds, combustion deflectors and combustion liners. Further, the counterflow cooling arrangement of the instant embodiment may also be utilized in various transition pieces where cooling is desirable.

Referring now to FIGS. 23 and 24, the counterflow impingement cooling arrangement of FIG. 22 may be additionally utilized with a plurality of cooling features 270 that may be positioned on the first engine component 230. According to FIGS. 23 and 24, various types of cooling features 270 are depicted as exemplary and non-limiting embodiments.

Referring first to FIG. 23, a side schematic view of an exemplary construction is provided including a first engine component 230 and a second engine component 250. The first engine component 230 may be for non-limiting example a nozzle, a shroud, a combustor liner, combustor deflector or other transition pieces as with previous non-limiting embodiments. The second engine component 250 may be an insert which includes a plurality of impingement cooling holes 252 including any of the previous embodiments or combinations of the previous embodiments. The second engine component 250 is disposed adjacent to the first engine component 230, with a gap therebetween, and receives cooling flow path 40. The cooling fluid, for example compressed air, in the cooling air flow path 40 passes through the impingement cooling holes 252 to the first engine component 230.

The second engine component 250 is depicted in the exemplary schematic view as an upper horizontal structure in the figure and includes a plurality of angled cooling apertures 252 extending through the component 250. These may take any of the various forms as previously described as related to the individual holes 252 and as related to the groups of holes 252 and the component 250, for example insert, is not limited to a horizontal structure and is not limited to a flat plate form. Additionally, the second engine component 250 may not be limited to a constant thickness but instead, may vary thickness and may or may not be flat.

In the depicted embodiment, beneath the cooling apertures 252 and spaced opposite the second component 250, which may represent the insert, is the first component 230. A hot combustion gas path 41 is shown passing along a hot surface, for example the lower surface of component 230. The upper surface of the component 230 is a cooling surface 231 which is impingement cooled. The first engine component 230 includes a plurality of discrete cooling features 270 which extend from cooling surface 231 of the first engine component 230 toward the second engine component 250. The discrete cooling features 270 may take various shapes, geometries, forms and various types are shown extending from the cooling surface 231 of the engine component 230 into the gap between engine components 230, 250. For example, the cooling features 270 may vary in width or have a constant width. Width is measured as the base dimension where the feature 270 meets the surface 231 and height is measured as the centerline dimension of the generally symmetric feature shape from the base to the top of the feature. The width-to-height ratio may be in the range of about 1:1 to about 1:5. Further, the cooling features 270 may have a length wherein the length and height are substantially equal or not substantially equal. The length may be up to about 7 times the height according to some embodiments but may be of shorter length-to-height ratio. The side view may be polygon, cylindrical, triangular or other shapes, any of which may include sharp corners or alternatively may have curved or radiused corners in order to improve aerodynamics. By polygon, it is meant that the cooling features 270 have at least three straight sides and angles as shown in side view. Similarly, fillets or corner radii may be utilized where the discrete cooling features 270 meet the component 230.

According to some embodiments, the features 270 extend from the engine component 230 toward the insert 250. Additionally, while the embodiments shown heretofore have been related primarily to nozzles and shrouds, it is within the scope of the instant disclosure that the structure may further comprise other engine components which are cooled by way of impingement cooling within a gas turbine engine.

Referring still to FIG. 23 and additionally to FIG. 24, which depicts a top view of the cooling features 270 of FIG. 23, the cooling feature 771 is first discussed. A plurality of cooling features 270 are shown along the engine component 230 and will be described from left to right. It should be understood that any of the following embodiments may be used together with similar fins or with other fins shown.

Referring to the left side of the component 230, the first embodiment cooling feature 771 is shown. The first cooling feature 771 is generally fin shaped. According to the first embodiment, the fin shaped feature 771 is generally triangular when shown in the side view of FIG. 22. The fin 771 has a substantially vertical forward edge 771a and tapers from an upper end downwardly to the engine component surface along surface 771b. The cooling feature or fin 771 may have one or more side walls 771c which may be straight, curved or taper from a wider forward end to a narrower aft end. Alternatively, the narrow end may be forward (to the left) and may widen moving aft (to the right) and may have tapers which are linear, curved or otherwise arcuate or curvilinear. Additionally, while the sidewalls 771c are generally vertical, they may be curved or angled between the upper surface 771b and the surface of component 230.

The feature 771 includes a semi-circular cross-section at either or both of the forward end and the aft end, as shown in FIG. 24. The feature 771 has a forward end curvature with a radius dimension which is of a first radius and an aft end curvature with a second radius dimension wherein the first dimension is greater than the second dimension. This configuration provides the taper from the forward end to the aft end of the fin 771. The side walls 771c may be tapered to provide the feature 771 varying width and the desired aerodynamic effect for the cooling. Alternatively to the semi-circular cross-section, the forms may be elliptical or other arcuate shapes for this and all other embodiments.

In this embodiment, the impingement cooling fluid may be aimed to engage the cooling features 270, that is aligned with the cooling features 270. For example, the axis of the cooling holes 252 may be aligned with or intersect the feature 270. Alternatively, the impingement cooling fluid may be directed to an area between the features or staggered or offset from the feature 270 but instead may impinge the surface 231 of the component. For example, the axis of cooling holes 252 may not intersect the cooling holes 252.

Referring again to FIG. 23, a second embodiment of the cooling feature 270 is shown in the form of feature or fin 772, wherein the forward wall 772a of the feature is angled rather than vertical. Again, the forward end and aft end may include semi-circular cross-sections. The forward end of the fin 772 has a first radius. A second radius is located at an intermediate location. Subsequently, at the aft end the radius of the curvature is less than the intermediate location and may be the same or less than the forward wall as shown in FIG. 24. The top of the fin 772 has a first surface 772a which rises to the intermediate location and a second surface 772b which depends downwardly from the intermediate location which tapers to the aft end. The fin 772 also widens from the first end to the intermediate location and narrows from the intermediate location to the aft end. The side view of the discrete cooling feature shows that the fin 772 is also triangular shaped but does not have a forward wall which may be vertical as in the first embodiment. Sidewalls may also be curved, linear or tapered from surfaces 772a, 772b to surface of the component 230. The profile of the feature 772 is formed such that the forward surface 772a is generally less than the length of the aft surface 772b. In other words, the peak of the fin shaped feature 772 is closer to the forward end than the aft end.

Referring now to the third embodiment shown in FIG. 23, the discrete cooling feature 773 may be generally conical in shape. In this embodiment, the side view of the fin 773 shows a substantially triangular shaped cooling feature wherein the peak of the fin shape is substantially centered. As a result, the forward wall 773a and aft wall 773b shown in the side view of FIG. 23 are generally of equal length as opposed to the first two embodiments previously described. As shown in the top view of FIG. 24, the cooling feature 773 is generally circular when viewed from above.

Referring now the fourth embodiment of FIG. 22, the side view shows the feature 274 is generally rectangular shaped. The discrete cooling feature 774 is shown in FIG. 23 with a forward radius of a first size and an aft radius of substantially the same size. When viewed from above, in FIG. 24, the feature 774 is generally diamond shaped. The forward end and the aft end of the feature 774 extend vertically from the component 230. The cooling feature or fin 774 has side walls 774a which increase in thickness from the forward to the middle location due to the radius of the cross-section at the central location, in the forward to aft (left to right) direction along the fin 774. Beyond the center location, the feature sidewall 774b decreases in thickness to a smaller radius size at the aft end of the feature 774, where the feature is narrow, as is the forward end. Thus, as compared to the second embodiment wherein the intermediate change in dimension occurred closer to the forward end of the fin and the aft end, the present embodiment has a central location where the fin has its widest location in the direction of flow 40. However, this is not limiting as the widest area need not be at the center. As shown in the side view of FIG. 23, the embodiment looks substantially rectangular in profile as the forward and aft walls are generally vertical. However, it is within the scope of the embodiment that the forward and aft walls be angled according to other embodiments described.

Referring to the fifth embodiment of FIG. 23, the side view shows a generally square or rectangular shaped discrete cooling feature or fin 775. The feature 775 has forward wall 775*a* is substantially vertical as with the previous embodiment and the first embodiment. The first wall 775*a* has a radius dimension providing the round forward end of the feature 775. The feature 775 further comprises sidewalls 775*b* (FIG. 24) which taper back to an aft vertical wall. The aft end may be pointed rather than radiused as in previous embodiments. The embodiment is shown more clearly in FIG. 24 with the forward dimension of the cooling feature having a larger radius dimension which decreases down to a point at the aft end of the fin.

As shown in FIG. 23, the final embodiment is generally cylindrically shaped cooling feature 776 having a round cross-section. This embodiment may be defined as a pin structure rather than a fin shape. As previously discussed, these embodiments may be used together or a single embodiment may be utilized and spaced apart from one another. Additionally, other embodiments are possible wherein combinations of features of the various embodiments may be used to form additional discrete cooling features.

Referring again to FIG. 23, the cooling air flow 40 is depicted as arrows passing through the apertures 252. The aiming of the cooling apertures 252 may be discussed by the axis of the aperture which corresponds to the depicted arrows representing the air flow. The cooling features 270 may be oriented in at least two manners relative to the cooling holes 252. According to some embodiments, the features 270 are aligned with the cooling holes 252 wherein the axis of the cooling hole 252 intersects or impinges the feature 270. According to alternate embodiments, the features 270 are staggered relative to the cooling holes 252 and offset from direct alignment with the apertures 252. In this embodiment, the axis of the cooling holes 252 may not engage the feature 270 but instead may engage the surface 231 of component 230. Further, the features 270 may be spaced apart uniformly or may be spaced apart non-uniformly. Still further, the features 270 of the engine component 230 may define one or more patterns wherein the multiple patterns may be spaced apart in a uniform manner or may be spaced in a non-uniform manner in ways previously discussed with the cooling holes. Further, one skilled in the art should realize that this disclosure does not require a single feature 270 for each aperture 252. There may be more features 270 or more apertures 252.

In the embodiment, where the cooling features 270 are aligned with the cooling holes 252, the holes 252 may be positioned such that the cooling air 40 is aligned with the forward walls of the features 270. Alternatively, the cooling air may be directed to engage the upper surfaces of the cooling targets. Still further, the cooling air may engage alternate locations of the cooling features 270.

Figure 25:
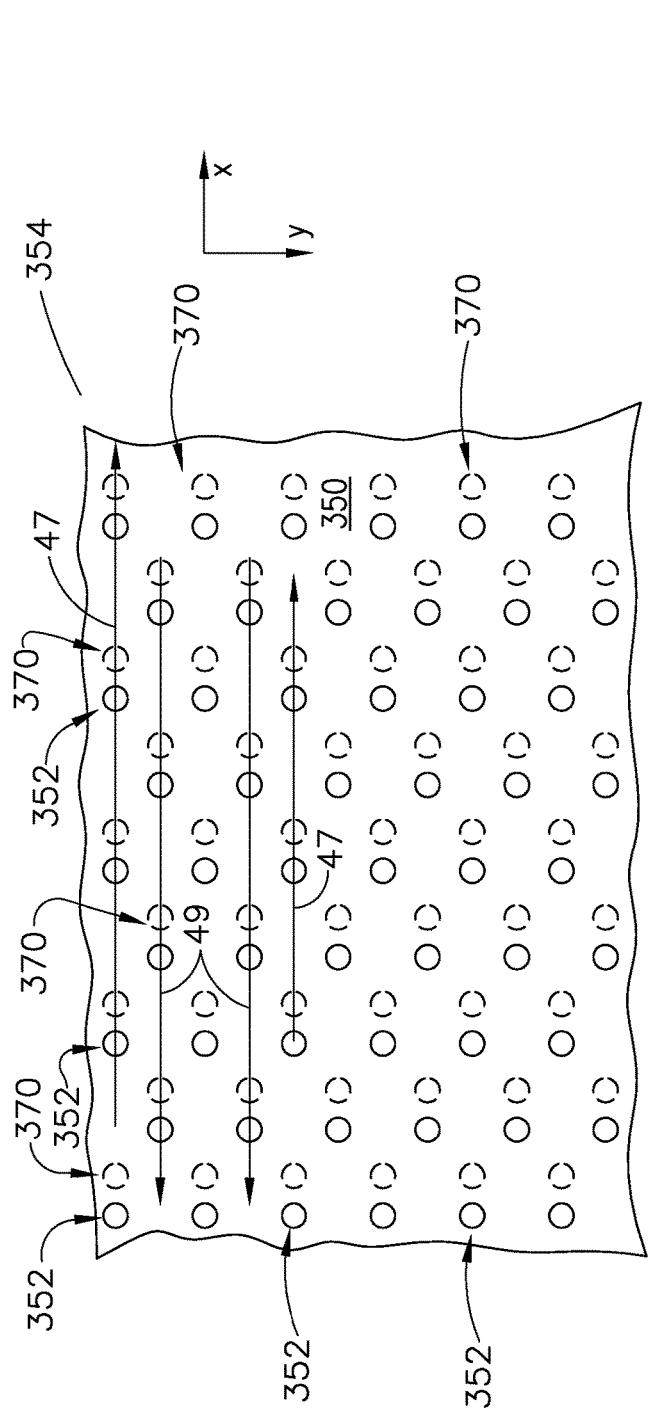
FIG. 25 is a top view of an exemplary engine component with angled impingement and opposite cooling features.

Referring now to FIG. 25, a top view of an embodiment is shown having various exemplary discussed features desired for use in exemplary components. In the top view, the arrangement of cooling aperture 352 are shown in an array 354 wherein the apertures 352 are aligned with the features 370. These features 370 are below the surface 350 as indicated in FIG. 25, but are shown for purpose of illustration in this view. The array 354 is defined in this example by an x-axis of first rows and a y-axis of second rows. The array 354 of apertures 352 is staggered meaning that a first row, for example in the x-axis direction, is offset by some amount in the x-direction to the adjacent row in the x-direction. The same may be said for the rows of the y-direction. However, in other embodiments, the apertures of one or more rows may be aligned rather than staggered. In this embodiment the spacing between apertures 352 is uniform but alternatively, may be non-uniform as previously described.

Figure 26:
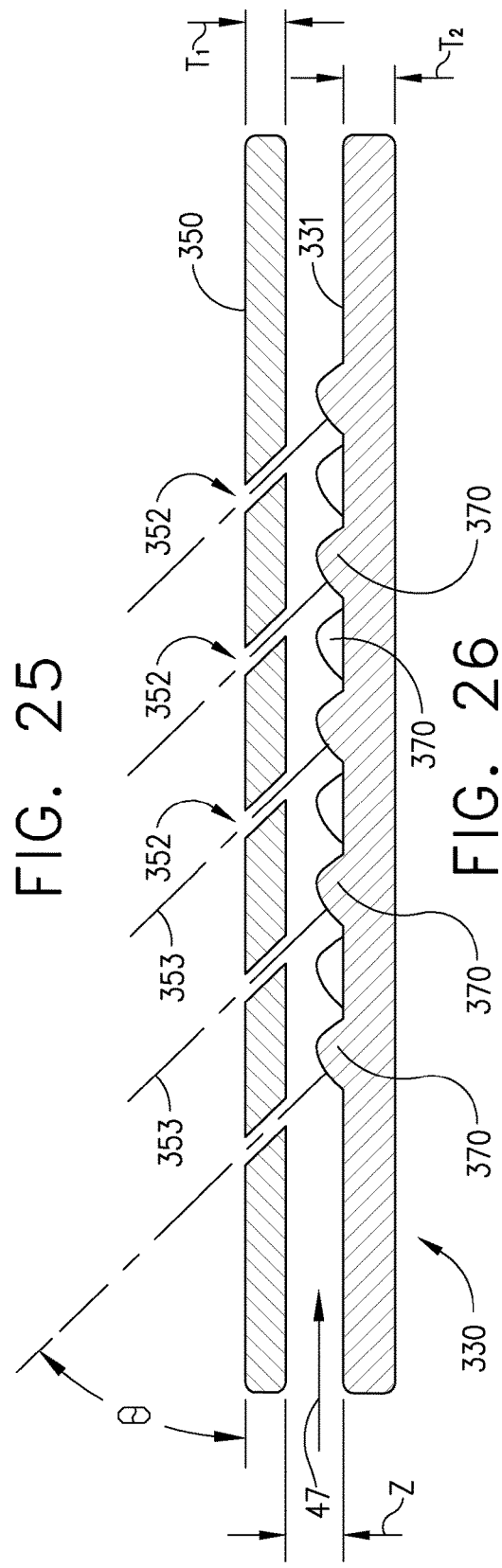
FIG. 26 is a side section view of one configuration of cooling fluid flow of the cooling features of FIG. 25.

Referring now to FIG. 26, the side section view of the view of FIG. 25 is shown. The apertures 352 are defined in part by axes 353 which also define a direction of flow of cooling fluid through apertures 352. As described, the features 370 are protruding from the first engine component 330.

According to the instant embodiment, the axis 353 of each of the cooling holes 352 depicts that the impingement point of the cooling flow 40 (indicated by axis 353) passing therethrough engages the cooling feature 370. This is due to the alignment in the x-direction with the aperture axes 353 for impingement of cooling fluid on the features 370. One component 47 of the counterflow 46 is shown. More specifically, the cooling flow 40 engages the forward edge or surface of the feature 370 at the section cut depicted. However, alternative embodiments may provide that the features 370 are not aligned with the impingement apertures but instead, are offset, for example in the y-direction relative to the apertures 353.

Alternate section cuts may show that the aperture axes 353 direct cooling flow in an opposite direction (counterflow component 49) so that the cooling flow engages the cooling feature 370 from the right hand or aft side of the cooling feature rather than the forward or left hand side 370. This produces the counterflow 46. Additionally, the cooling features 370 may be offset a direction perpendicular to the aperture axes 353 or alternatively, some distance from the axes 353 or at some alternate angle. Still further, the counterflow component 47, 49 may be diagonally oriented in the view shown in FIG. 25. The components 47, 49 may be axial, circumferential or combinations.

Figure 27:
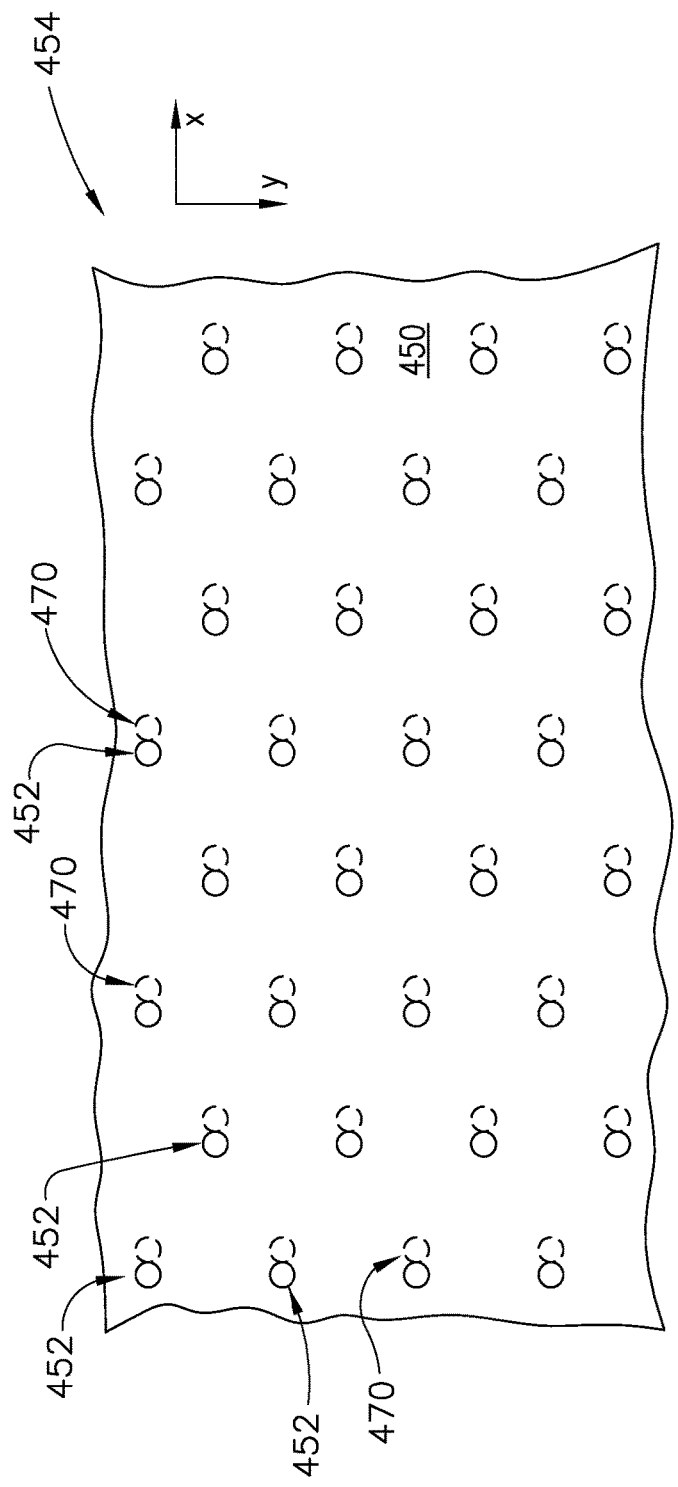
FIG. 27 is a top view of an alternate embodiment of an exemplary engine component.

With regard now to FIG. 27, a top view of an alternate array 454 is shown. Again the view depicts both the aperture 452 and the feature 470, which is actually beneath the depicted component 450. The apertures 452 are formed in the array 454 which is of uniform spacing, although non-uniform spacing may be utilized. The rows of apertures 452 may be staggered and are staggered in the x and y directions. Further however, other embodiments may have rows which are aligned rather than staggered as with the previous embodiments.

Figure 28:
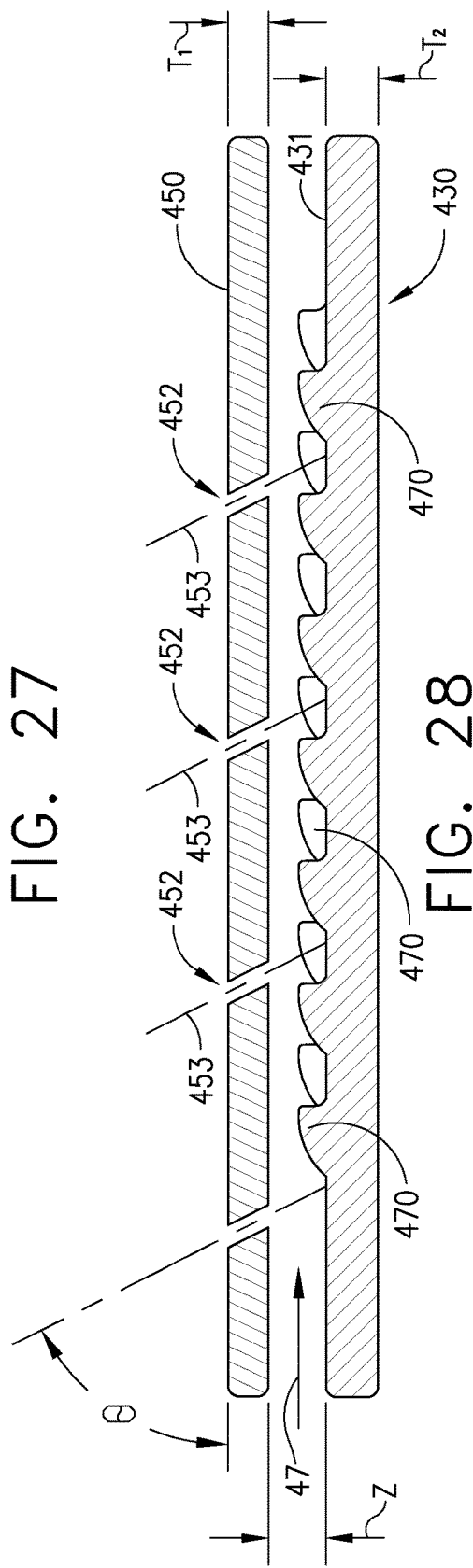
FIG. 28 is a side section view of a second configuration of cooling fluid flow of the cooling features of FIG. 27.

With reference now to FIG. 28, a side section view of the embodiment of FIG. 27 is shown. The second component 450 includes a plurality of impingement cooling apertures 452 which are angled as with the previous embodiments and define one or more arrays 454. An array is also provided of the cooling features 470 which protrude from the first component 430. The axes 453 create the direction 47 of cooling flow 40 passing through the insert 450 toward the first engine component 430. In this embodiment, the impingement may occur between the cooling features 470 rather than on the cooling feature 470 as with the embodiments of FIGS. 25 and 26. Additionally, as previously indicated, a section cut at an alternate location will depict that a second counterflow 49 may be created between or along adjacent rows of cooling features 470 commensurate with the counterflow 46 impingement cooling configuration.

In this embodiment, the axes 453 show the direction of cooling flow for the cooling fluid 40 passing through the insert 450 toward the first engine component 430. As noted previously, the impingement on the surface 431 may also occur by offsetting the features 470 corresponding to an aperture 452 away from the aperture, for example in the y-direction. Additionally, the angle of the aperture axes 353 and 453 differ and may provide a further means of adjusting the impingement of the axes 353, 453 on or around the feature 370, 470.

As shown in the various embodiments, the features 370, 470 may have sides that are linear, curved, triangular, or combinations thereof. Additionally, the features may be circular or semi-circular in shape when viewed in the side view depicted. Further, the features 370 may be arranged in a plurality of manners. For example, the features 370, 470 may be aligned with the axes of apertures 352, 452 or may be offset or staggered relative to the axes of apertures 352, 452 in some manner. Further, the features 370, 470 may be arranged in various manners such as to spacing. For example, the features 370, 470 may be spaced apart in a uniform manner or may be spaced apart in a non-uniform manner. Additionally, with respect to the cooling apertures, the features may be aligned or staggered relative to one another, wherein the rows may be aligned in two dimensions, for example or may be aligned in one dimension and offset in a second dimension. The cooling apertures may have an axis defining a general direction of cooling air and therefore, the cooling aperture may be aligned or non-aligned with the features 370, 470. Further, the features 370, 470 may be spaced apart uniformly or may be spaced apart non-uniformly. Still further, the features 370, 470 of the engine component 330, 430 may define one or more patterns wherein the multiple patterns may be spaced apart in a uniform manner or may be spaced in a non-uniform manner.

Figure 29:
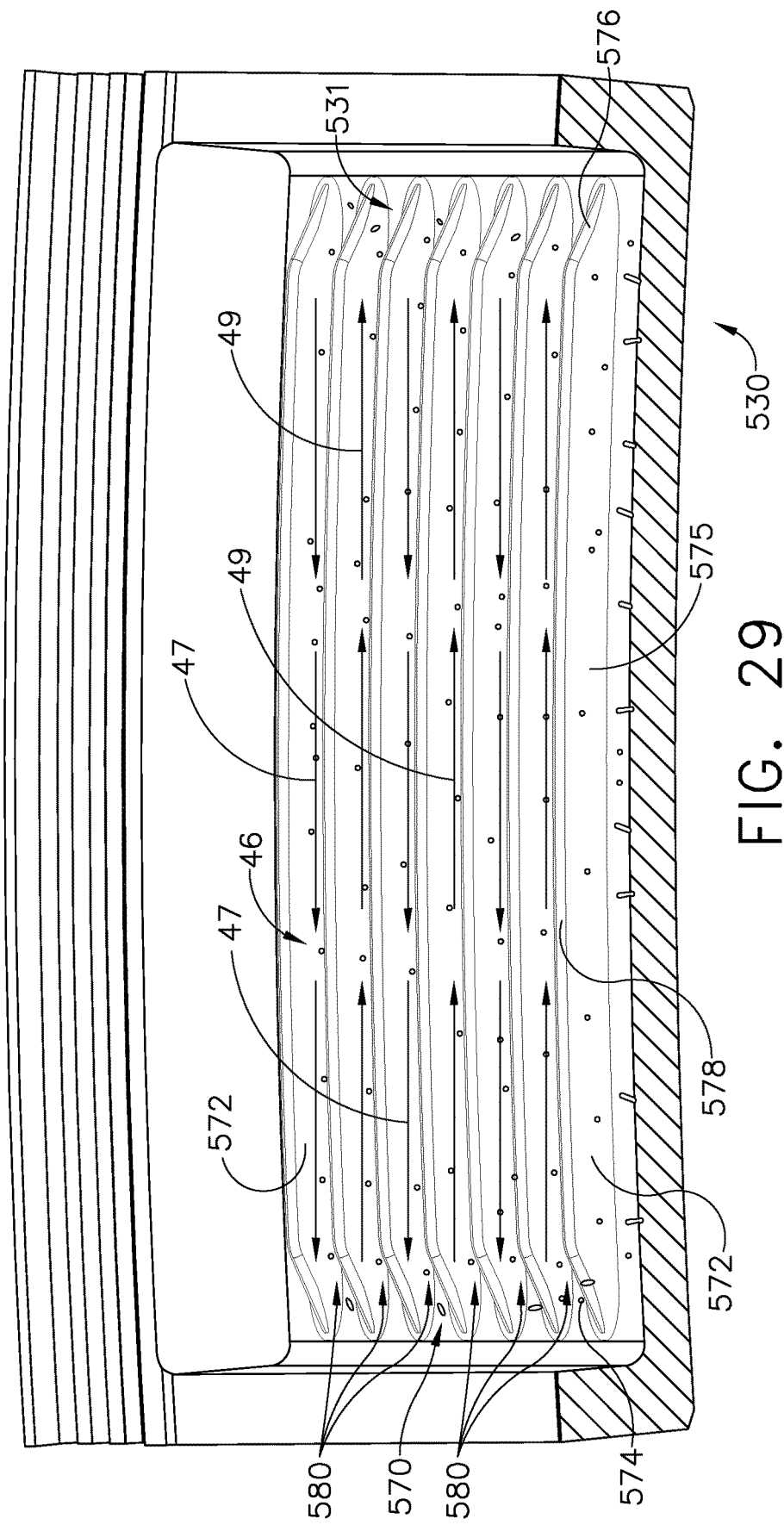
FIG. 29 is an upper isometric view of an alternative counterflow cooling feature on the first engine component.

Referring now to FIG. 29, an upper isometric view of a further alternative embodiment of the counterflow impingement cooling assembly is depicted. According to this instant embodiment, the engine component 530 is shown having a plurality of cooling features 570 defined by continuous or piecewise continuous walls 572. The walls 572 have a width and a height extending from the cooling surface 531 of the component 530. Width is measured at the base dimension where the feature meets the surface 531 and height is measured as the centerline dimension of the generally symmetric feature shape from the base to the top of the feature. The width and height may be generally close to a 1:1 ratio, although some embodiments may differ. The width-to-height ratio may be in the range of about 1:1 to about 1:5. However, the length dimension measured from left to right in the depicted embodiment may be much greater than the width or height of the wall 572. For example, the length of the wall 572 may be at least 10 times greater than the width or the height of the wall 572 whereas the fins or previous cooling features 270 (FIG. 23) may have had a length which was up to 7 times longer than the width or height of the fin or feature. Thus, the wall 572 is termed "continuous" or at least "piecewise continuous" wherein multiple walls are positioned in adjacent relationship to define a longer total wall length.

The walls 572 and channels 580 may extend in a plurality of directions. The walls 572 may extend in a generally axial direction or a generally circumferential direction. The walls 572 and therefore channels 580 may have components in combinations of these directions as well. Further, while the terms "axial" and "circumferential" apply to many of the embodiments utilized in this description, other components and orientations having complex curvatures may be utilized such that the orientations or descriptions "axial" and "circumferential" may not strictly apply. The design intent for groups of arrays of features and the associated angled apertures may be applied to any component surface in its relative sense as assembled in the gas turbine engine.

The wall 572 may have a first surface 574 and a second surface 576 which taper or curve from the surface 531. Extending between the surfaces 577, 576 is an upper edge or surface 578. The walls 572 may further comprise side surfaces 575 which may be linear, curvilinear or some combination thereof or may be comprised of multiple segments of linear, curvilinear, arcuate or combinations thereof. The walls 572 define a plurality of channels 580 extending therebetween.

Within these channels 580, the counterflow 46 defined by the first flow direction 47 and the second flow direction 49 are shown passing. Alternatively, the plurality of flow directions 47, 49 may impinge upon the walls 572 and travel along the surfaces, top or sides of the walls 572 rather than through the channels 580 between the walls 572.

Figure 30:
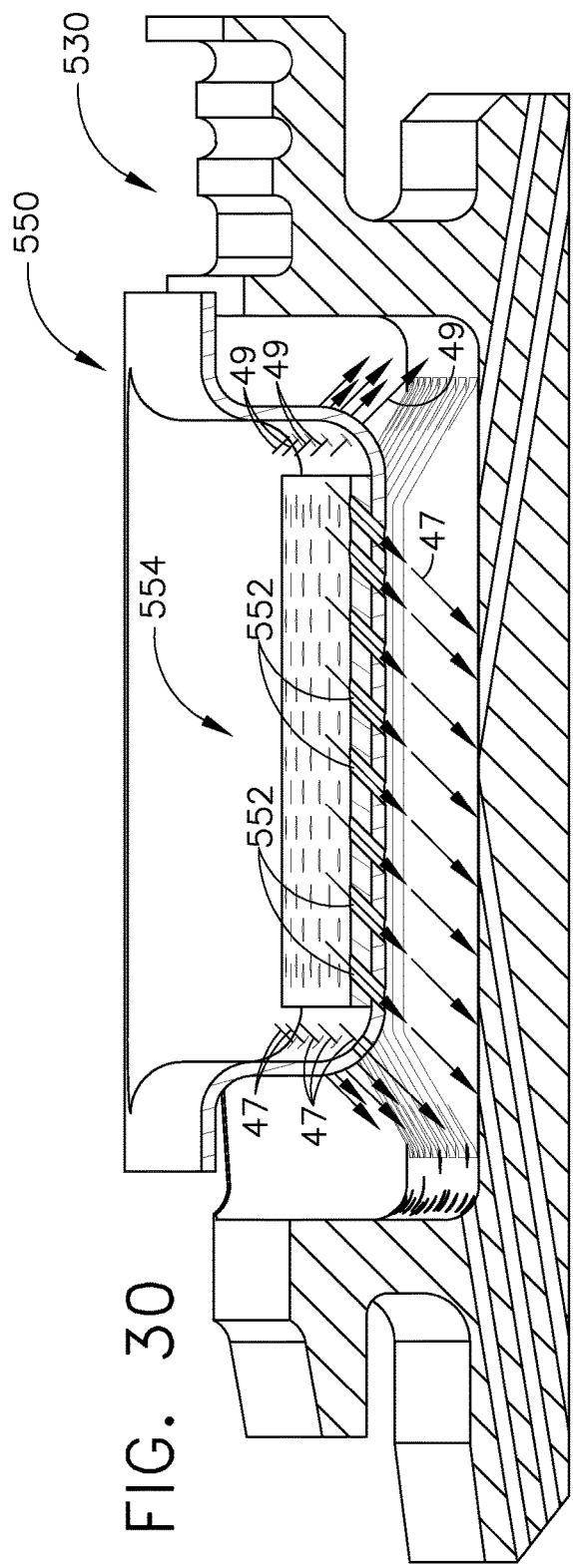
FIG. 30 is a first side section view of the alternative cooling feature of FIG. 29.

Referring now to FIG. 30, a section view of the first engine component 530 and insert 550 is depicted. The second engine component 550 includes a plurality of angled impingement cooling holes 552 as previously described. The impingement cooling holes 552 define an array 554 wherein adjacent rows direct air in opposite directions along the cooling surface of the first engine component 530. The rows of apertures 552 direct air flow in a first direction 47. An adjacent row of apertures 552 direct the cooling flow in a second direction 49 and the pattern continues so as to provide counter or opposite flows in adjacent rows through the array 554.

Along the cooling surface of the first component 530, are a plurality of continuous walls 47 which define rows of channels 580 (FIG. 29). The counterflow directions 47, 49 flow either through the channels 580 or impinge on the walls 572 defining the channels 580. However, in either instance, the counterflow directions 47, 49 move in opposite directions to aid in cooling.

Figure 31:
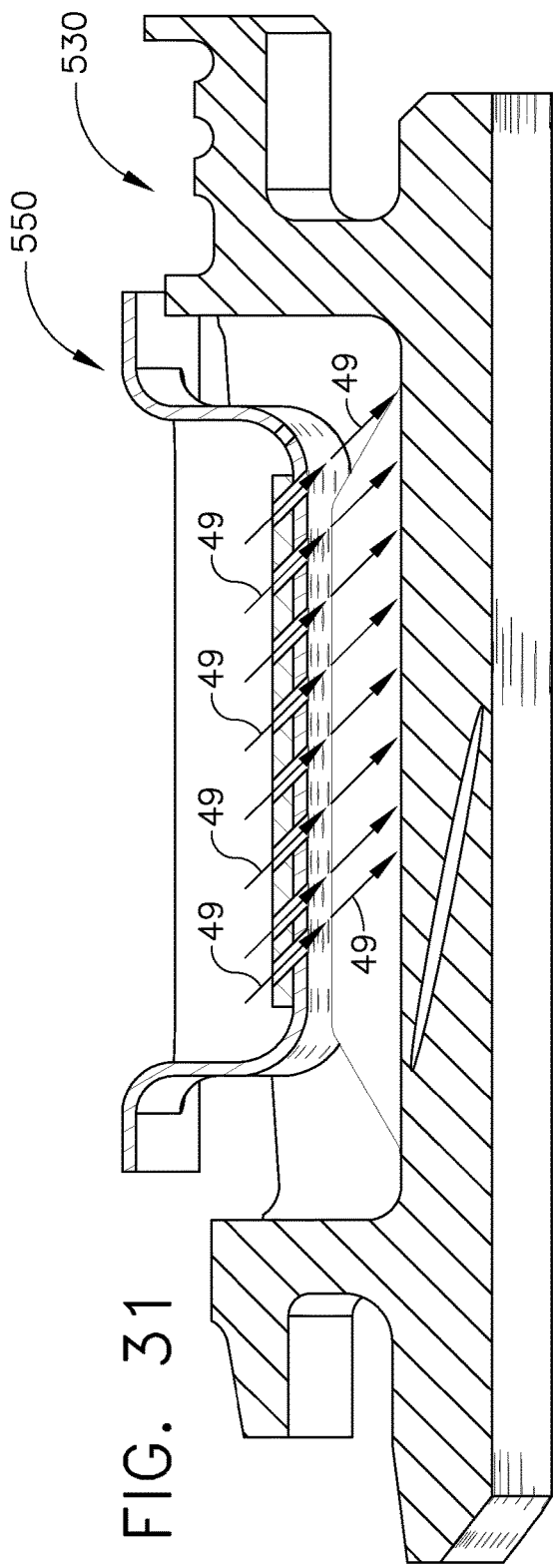
FIG. 31 is a second side section view of the alternative cooling feature of FIG. 29; and, FIG. 32 is a section view perpendicular to the view of FIGS. 30 and 31.

Referring now to FIG. 31, an alternate section cut is taken within the embodiment shown in FIG. 29 such that the counter or second flow direction 49 is shown primarily extending through the second component 550. In this embodiment, the section cut is taken such that the apertures 552 are extending in an opposite direction from that shown in FIG. 30. As with the previous embodiment, the rows of counterflow directions 47, 49 are depicted but the front or forward most flow, shown closest to the section, is the counter or second flow direction 49.

Figure 32:
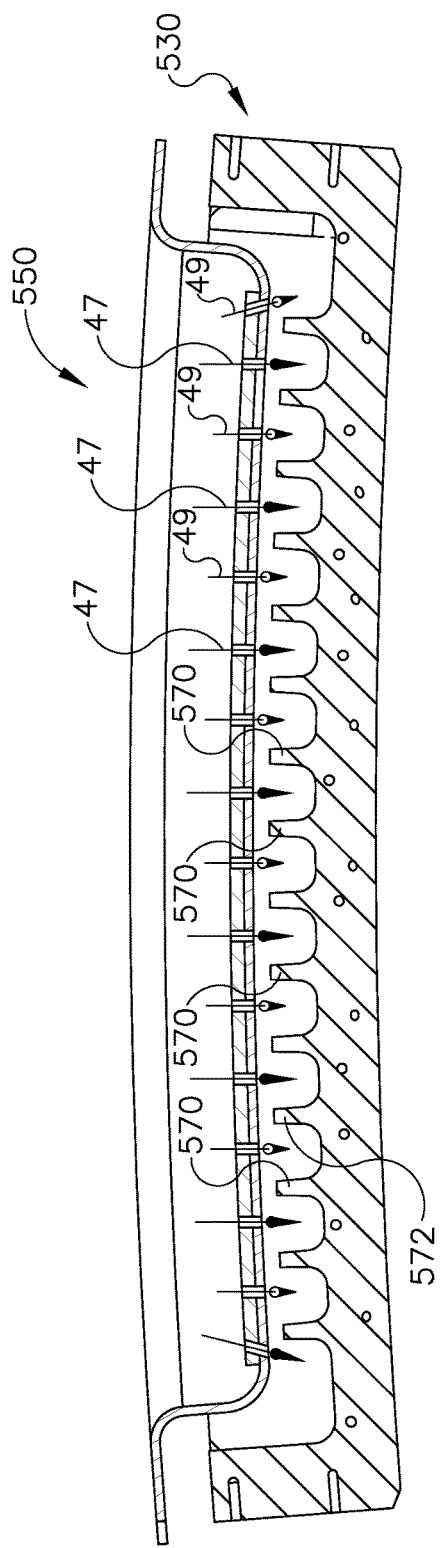

Referring now to FIG. 32, a section view of the embodiment of FIG. 29 is shown with the section taken in a perpendicular direction to that of the previous FIGS. 30 and 19. The counterflow directions 47, 49 are shown in this view extending through the second engine component 550 toward the first engine component 530. The opposite flow directions 47, 49 are adjacent to one another and are separated by the cooling features 570. In the instant embodiment, the cooling features are defined by the walls 572, for example. However, these cooling features 570 may also represent any of the previously defined cooling features of the previous embodiments.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain embodiments of methods and materials have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and" consisting essentially of shall be closed or semi-closed transitional phrases, respectively, as set forth in the United States Patent Office Manual of Patent Examining Procedures, Section 2111.03.

The invention claimed is:

1. An aircraft engine component with particulate mitigation features, comprising:
   an engine component including an upstream wall, a downstream wall, having a cooled surface and a flow path on one side of the cooled surface;
   said cooled surface having a plurality of open channels defined by substantially continuous walls extending either circumferentially or axially along the cooled surface and terminating in top surfaces and in end profiles separate and spaced apart from the upstream wall and the downstream wall, the continuous walls arranged in spaced relationship to form the channels therebetween;
   the end profiles defined by a taper from the top surface to the cooled surface;
   an insert disposed adjacent to and spaced from the top surfaces and in flow communication with said flow path, wherein the flow path impinges at least one of the end profiles, walls, top surfaces, or channels;
   the insert having a plurality of openings forming an array through said insert;
   said openings extending through said insert at a non-orthogonal angle to a surface of said insert facing said cooled surface; and,
   said openings aimed at one of said plurality of channels and said substantially continuous walls.

2. The aircraft engine component of claim 1, said engine component being a shroud.

3. The aircraft engine component of claim 2, said insert being disposed between a shroud hanger and said shroud.

4. The aircraft engine component of claim 3, said channels disposed on an outer surface of said shroud facing said insert.

5. The aircraft engine component of claim 1, said engine component being a nozzle.

6. The aircraft engine component of claim 5, said nozzle including an inner band, an outer band and a vane extending between said inner band and said outer band.

7. The aircraft engine component of claim 6, said insert being disposed adjacent to an inner surface of said vane.

8. The aircraft engine component of claim 7, said channels disposed on an inner surface of one of said vane, said inner band and said outer band.

9. The aircraft engine component of claim 1, said substantially continuous walls having a length which is larger than a height.

10. The aircraft engine component of claim 1, said substantially continuous walls having a rectangular cross-section.

11. The aircraft engine component of claim 1, said substantially continuous walls varying in width.

12. The aircraft engine component of claim 1, said channels having a rectangular cross-section.

13. The aircraft engine component of claim 1, said channels having a curvilinear cross-section.

14. The aircraft engine component of claim 1, said openings being circular in cross-section.

15. The aircraft engine component of claim 1, said channels having a depth which is multiple times the size of an opening diameter.

16. An engine component assembly with impingement cooling counterflow, comprising:
- an engine component including an upstream wall, a downstream wall, a cooled surface and a flow path on one side of the cooled surface;
- said cooled surface having a plurality of open channels defined by substantially continuous walls extending either circumferentially or axially along the cooled surface and terminating in top surfaces and in end profiles separate and spaced apart from the upstream wall and the downstream wall, the continuous walls arranged in spaced relationship to form the channels therebetween; said engine component having a cooling fluid flow path on one side of said cooled surface;
- the end profiles defined by a taper from the top surface to the cooled surface;
- an insert disposed adjacent to and spaced from said engine component between said cooling fluid flow path and said engine component, wherein the flow path impinges at least one of the end profiles, walls, or channels;
- said the insert having a plurality of openings through said insert forming an array, said cooling fluid flow path passing through said plurality of openings to cool said cooled surface;
- said openings defining an array extending through said insert at non-orthogonal angles relative to said an insert surface facing said cooled surface;
- said array including at least one first row of said openings at a first non-orthogonal angle to said insert surface;
- said array including at least one second row of said openings, adjacent to said first row, said openings of said second row being disposed at a second non-orthogonal angle to said insert surface; and,
- said insert array creating a counterflow of impingement cooling wherein said cooling fluid flow path passing through said first row moves in a first direction along said cooled surface and said cooling fluid flow path passing through said second row moves in a second direction along said cooled surface substantially opposite said first direction.

17. The engine component assembly of claim 16, said engine component being at least one of a nozzle, a turbine shroud and a combustor.

18. The engine component assembly of claim 16, said openings being at equivalent angles relative to said insert surface.

19. The engine component assembly of claim 16, said openings being at different angles relative to said insert surface.

20. The engine component assembly of claim 16, said plurality of openings being of a single size.

21. The engine component assembly of claim 16, said plurality of openings being of various sizes.

22. The engine component assembly of claim 16, said plurality of openings being at least one shape.

23. The engine component assembly of claim 16, said plurality of openings being of uniform spacing.

24. The engine component assembly of claim 16, said plurality of openings being of non-uniform spacing.

25. The engine component assembly of claim 16, said cooling surface of said engine component further comprising a plurality of discrete cooling features.

26. The engine component assembly of claim 25, said discrete cooling features being a plurality of fins.

27. The engine component assembly of claim 26, said discrete cooling features forming an array.

28. The engine component assembly of claim 27, said cooling fluid flow being directed one of at or between said discrete cooling features.

29. The engine component assembly of claim 16, said cooling surface of said engine component further comprising a plurality of cooling channels.

30. The engine component assembly of claim 29, said plurality of cooling channels defined by a plurality of walls.

31. The engine component assembly of claim 30, said walls defined by having a length which is substantially larger than a height.

32. The engine component assembly of claim 31, said cooling fluid flow path being directed at one of said cooling channels or said walls.

33. The engine component assembly of claim 32 wherein said cooling fluid flow path impinges at least one of a top of said walls or a sidewall of said walls.

* * * * *